US012718179B2

(12) United States Patent
Oba et al.

(10) Patent No.: US 12,718,179 B2
(45) Date of Patent: Aug. 25, 2026

(54) INFORMATION MANAGEMENT SYSTEM

(71) Applicants: KABUSHIKI KAISHA TOSHIBA, Tokyo (JP); TOSHIBA DIGITAL SOLUTIONS CORPORATION, Kawasaki (JP)

(72) Inventors: Shunsuke Oba, Kawasaki (JP); Katsuhisa Chiba, Tokyo (JP); Hirotaka Ueki, Yokohama (JP)

(73) Assignees: KABUSHIKI KAISHA TOSHIBA, Kawasaki Kanagawa (JP); TOSHIBA DIGITAL SOLUTIONS CORPORATION, Kawasaki Kanagawa (JP)

( * ) Notice: Subject to any disclaimer, the term of this patent is extended or adjusted under 35 U.S.C. 154(b) by 113 days.

(21) Appl. No.: 18/708,193

(22) PCT Filed: Oct. 24, 2022

(86) PCT No.: PCT/JP2022/039450
§ 371 (c)(1),
(2) Date: May 7, 2024

(87) PCT Pub. No.: WO2023/079997
PCT Pub. Date: May 11, 2023

(65) Prior Publication Data

US 2025/0029049 A1 Jan. 23, 2025

(30) Foreign Application Priority Data

Nov. 8, 2021 (JP) ................................ 2021-181830

(51) Int. Cl.

| | |
|---|---|
| ***G06Q 10/08*** | (2024.01) |
| ***G06Q 10/0631*** | (2023.01) |
| ***G06Q 50/04*** | (2012.01) |

(52) U.S. Cl.
CPC ....... *G06Q 10/08* (2013.01); *G06Q 10/06315* (2013.01); *G06Q 50/04* (2013.01)

(58) Field of Classification Search
CPC .. G06Q 10/087; G06Q 10/06; G06Q 30/0201; G06Q 50/04
See application file for complete search history.

(56) References Cited

U.S. PATENT DOCUMENTS 8,126,754 B1 * 2/2012 Nakasu .............. G06Q 10/0631 705/7.12
2002/0193972 A1 12/2002 Kudo et al.
(Continued)

FOREIGN PATENT DOCUMENTS

CN 111062150 A 4/2020
EP 3 229 118 A1 10/2017
(Continued)

OTHER PUBLICATIONS

Saqlain, M., Piao, M., Shim, Y., & Lee, J. Y. (2019). Framework of an IoT-based Industrial Data Management for Smart Manufacturing. Journal of Sensor and Actuator Networks, 8(2), 25. (Year: 2019).*
(Continued)

*Primary Examiner* — Johnna R Loftis
(74) *Attorney, Agent, or Firm* — Finnegan, Henderson, Farabow, Garrett & Dunner, LLP

(57) ABSTRACT

[PROBLEM] To provide an environment in which multiple factories can individually manage information about production and manufacturing and can smoothly share or link the information.
[SOLVING MEANS] An information management system according to an embodiment is based on the assumption that each of cooperating factories holds a manufacturing plan based on a production management plan, a goods arrival plan about procurement from the other cooperating factories, and achievements from the manufacturing plan and the
(Continued)

goods arrival plan, and includes an existing manufacturing management system which independently manages plans and achievements of manufacturing in the factory. The information management system includes a storage apparatus configured to store, for each of the factories, a production request data model, a production instruction data model, and a goods arrival planning data model; a data accumulation management apparatus configured to structure the plans and the achievements of manufacturing acquired thorough the manufacturing management systems in the factories into the data models according to a predetermined data structure definition template; and an information management apparatus configured to refer to information about the plans and achievements of manufacturing in the other factories via the data models.

8 Claims, 16 Drawing Sheets

(56) References Cited

U.S. PATENT DOCUMENTS

| | | | | |
|---|---|---|---|---|
| 2004/0098292 | A1* | 5/2004 | Miller | G06Q 99/00<br>709/224 |
| 2018/0131691 | A1* | 5/2018 | Sundaram P | H04L 67/141 |
| 2019/0258230 | A1* | 8/2019 | Chiba | G05B 19/418 |
| 2023/0368154 | A1* | 11/2023 | Feng | G16Y 20/20 |
| 2024/0094701 | A1* | 3/2024 | Mine | G06F 30/27 |

FOREIGN PATENT DOCUMENTS

| | | | |
|---|---|---|---|
| JP | 2002-373191 | A | 12/2002 |
| JP | 2009-9188 | A | 1/2009 |
| JP | 6921904 | B2 | 8/2021 |
| WO | WO 2016/088201 | A1 | 6/2016 |

OTHER PUBLICATIONS

Sophie D'Amours, Benoit Montreuil, Pierre Lefrançois, François Soumis, Networked manufacturing:: The impact of information sharing, International Journal of Production Economics, vol. 58, Issue 1, 1999 (Year: 1999).*

Japan Patent Office, Decision to Grant a Patent in JP App. No. 2021-181830, 3 pages, and machine translation, 2 pages (Jan. 28, 2025).

* cited by examiner

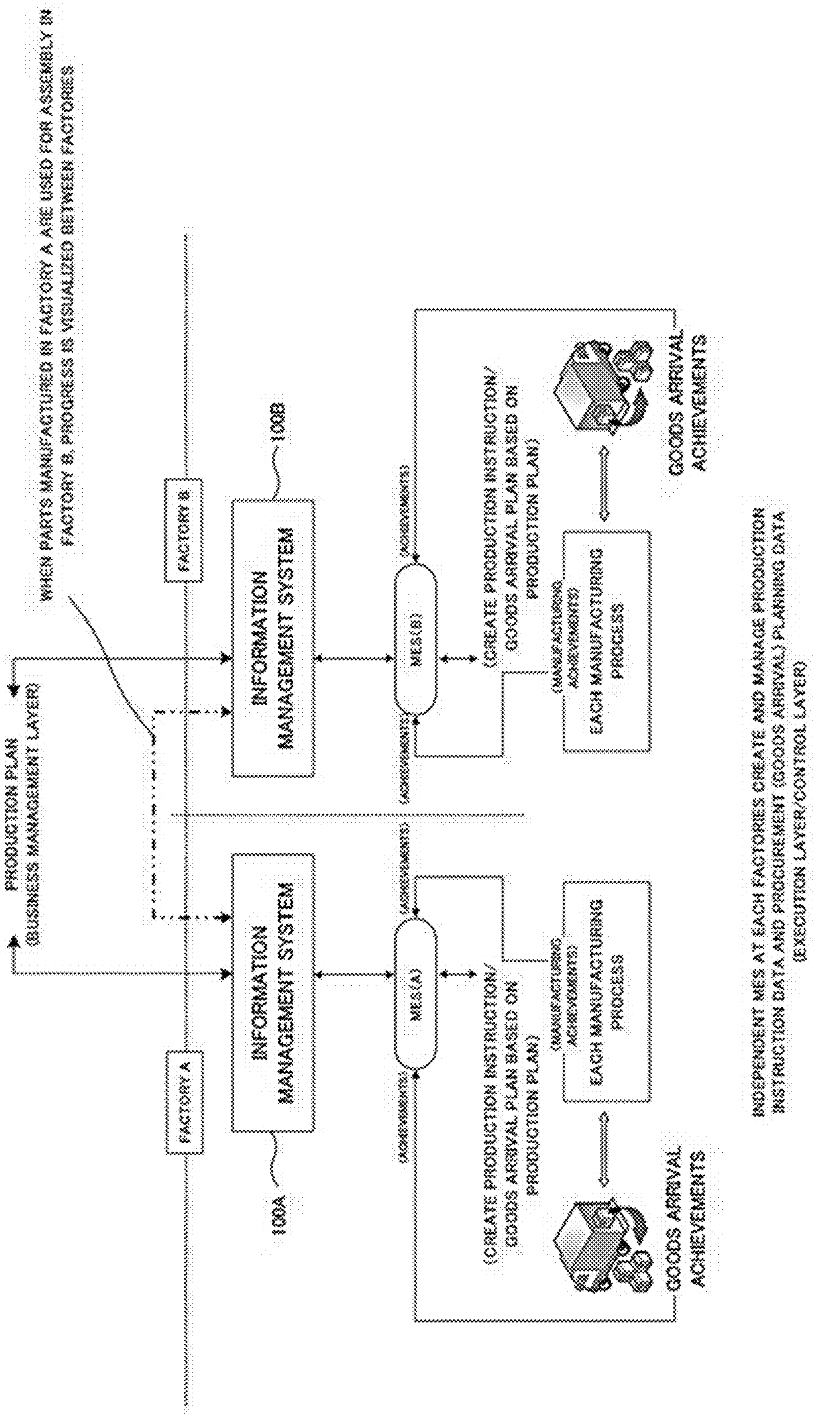

FIG. 2
WHEN PARTS MANUFACTURED IN FACTORY A ARE USED FOR ASSEMBLY IN FACTORY B, PROGRESS IS VISUALIZED BETWEEN FACTORIES
PRODUCTION PLAN (BUSINESS MANAGEMENT LAYER)
FACTORY A
FACTORY B
INFORMATION MANAGEMENT SYSTEM
INFORMATION MANAGEMENT SYSTEM
100A
100B
M.E.S.(A)
M.E.S.(B)
(ACHIEVEMENTS)
(CREATE PRODUCTION INSTRUCTION/ GOODS ARRIVAL PLAN BASED ON PRODUCTION PLAN)
(CREATE PRODUCTION INSTRUCTION/ GOODS ARRIVAL PLAN BASED ON PRODUCTION PLAN)
(MANUFACTURING ACHIEVEMENTS)
EACH MANUFACTURING PROCESS
EACH MANUFACTURING PROCESS
GOODS ARRIVAL ACHIEVEMENTS
GOODS ARRIVAL ACHIEVEMENTS
INDEPENDENT MES AT EACH FACTORIES CREATE AND MANAGE PRODUCTION INSTRUCTION DATA AND PROCUREMENT (GOODS ARRIVAL) PLANNING DATA (EXECUTION LAYER/CONTROL LAYER)

FIG. 5

(PRODUCTION INSTRUCTION DATA)

| 【SUBJECT】 | 【OBJECT】 | 【EVENT】 | 【TIME】 | 【PLACE】 | 【CAUSE】 | 【SITUATION】 |
|---|---|---|---|---|---|---|
| (Who)<br>Who | (Whome)<br>Whome | (What)<br>What | (When)<br>When | (Where)<br>Where | (Why)<br>Why | (How)<br>How |
| FACILITY 1<br>(FACILITY SERIAL ID : 1111) | COMPONENT PART NUMBER(D-001)<br>SERIAL ID (31235)<br>COMPONENT PART NUMBER(E-001)<br>SERIAL ID (41234)<br>COMPONENT PART NUMBER(F-001)<br>SERIAL ID (41235) | SUBSTRATE ASSEMBLY | 2016/9/2 10:30 | THIRD STATION OF SUBSTRATE ASSEMBLY FIRST LINE OF SUBSTRATE ASSEMBLY PROCESS | ... | ... |
| FACILITY 1<br>(FACILITY SERIAL ID : 1111) | COMPONENT PART NUMBER(D-001)<br>SERIAL ID (78764)<br>COMPONENT PART NUMBER(E-001)<br>SERIAL ID (68765)<br>COMPONENT PART NUMBER(F-001)<br>SERIAL ID (68764) | SUBSTRATE ASSEMBLY | 2016/9/2 11:00 | THIRD STATION OF SUBSTRATE ASSEMBLY FIRST LINE OF SUBSTRATE ASSEMBLY PROCESS | ... | ... |
| ... | ... | ... | ... | ... | ... | ... |
| INSPECTION FACILITY 1<br>(FACILITY SERIAL ID : 2222) | COMPONENT PART NUMBER(D-001)<br>SERIAL ID (31235) | SUBSTRATE ASSEMBLY INSPECTION | 2016/9/2 11:00 | INSPECTION STATION OF SUBSTRATE ASSEMBLY FIRST LINE OF SUBSTRATE ASSEMBLY PROCESS | ... | ... |
| INSPECTION FACILITY 1<br>(FACILITY SERIAL ID : 2222) | COMPONENT PART NUMBER(D-001)<br>SERIAL ID (78764) | SUBSTRATE ASSEMBLY INSPECTION | 2016/9/2 11:15 | INSPECTION STATION OF SUBSTRATE ASSEMBLY FIRST LINE OF SUBSTRATE ASSEMBLY PROCESS | ... | ... |
| ... | ... | ... | ... | ... | ... | ... |
| FACILITY 2<br>(FACILITY SERIAL ID : 9999) | PRODUCT PART NUMBER(A-001)<br>SERIAL ID (12345)<br>COMPONENT PART NUMBER(B-001)<br>SERIAL ID (21234)<br>COMPONENT PART NUMBER(F-001)<br>SERIAL ID (21235) | ENTIRE PC ASSEMBLY | 2016/9/2 12:30 | FIRST STATION OF ENTIRE PC ASSEMBLY FIRST LINE OF ENTIRE PC ASSEMBLY PROCESS | ... | ... |
| ... | ... | ... | ... | ... | ... | ... |

TIME-SERIES

[PC ASSEMBLY FACTORY]
ENTIRE PC ASSEMBLY PROCESS (MANUFACTURING PLAN)
LAPTOP COMPUTER (A-001)
[BODY ASSEMBLY PROCESS]
BODY CASE (B-001)
HDD (C-001)
[SUBSTRATE ASSEMBLY PROCESS]
MOTHERBOARD (D-001)
[CPU MANUFACTURING FACTORY]
CPU (E-001)
[MEMORY MANUFACTURING FACTORY]
MEMORY (F-001)
POWER SUPPLY UNIT (G-001)
KEYBOARD (H-001)
[DISPLAY ASSEMBLY PROCESS]
DISPLAY (I-001)
LIQUID CRYSTAL PANEL (J-001)
LIQUID CRYSTAL COVER (K-001)

FIG. 10

PRODUCTION MANAGEMENT (PRODUCTION REQUEST DATA)

TIME-SERIES

| [SUBJECT] | [OBJECT] | [EVENT] | [TIME] | [PLACE] | [CAUSE] | [SITUATION] |
|---|---|---|---|---|---|---|
| (Who) Who | (Whome) Whome | (What) What | (When) When | (Where) Where | (Why) Why | (How) How |
| ~ | PART NUMBER(A-001) | PC | 2016/9/30 | PC ASSEMBLY FACTORY | ~ | PRODUCTION VOLUME (1,000 UNITS) |
| ... | ... | ... | ... | ... | ... | ... |
| ~ | PART NUMBER(A-001) | PC | 2016/12/31 | PC ASSEMBLY FACTORY | ~ | PRODUCTION VOLUME (1,500 UNITS) |

MANUFACTURING SITE (FACTORY)

(PRODUCTION INSTRUCTION DATA)

TIME-SERIES

| [SUBJECT] | [OBJECT] | [EVENT] | [TIME] | [PLACE] | [CAUSE] | [SITUATION] |
|---|---|---|---|---|---|---|
| (Who) Who | (Whome) Whome | (What) What | (When) When | (Where) Where | (Why) Why | (How) How |
| FACILITY 1 (FACILITY SERIAL ID : 1111) | COMPONENT PART NUMBER(D-001) SERIAL ID (31235)<br>COMPONENT PART NUMBER(E-001) SERIAL ID (41234)<br>COMPONENT PART NUMBER(F-001) SERIAL ID (41235) | SUBSTRATE ASSEMBLY | 2016/9/2 10:30 | THIRD STATION OF SUBSTRATE ASSEMBLY FIRST LINE OF SUBSTRATE ASSEMBLY PROCESS | ~ | ~ |
| FACILITY 1 (FACILITY SERIAL ID : 1111) | COMPONENT PART NUMBER(D-001) SERIAL ID (78764)<br>COMPONENT PART NUMBER(E-001) SERIAL ID (68765)<br>COMPONENT PART NUMBER(F-001) SERIAL ID (68764) | SUBSTRATE ASSEMBLY | 2016/9/2 11:00 | THIRD STATION OF SUBSTRATE ASSEMBLY FIRST LINE OF SUBSTRATE ASSEMBLY PROCESS | ~ | ~ |
| ... | ... | ... | ... | ... | ... | ... |
| INSPECTION FACILITY 1 (FACILITY SERIAL ID : 2222) | COMPONENT PART NUMBER(D-001) SERIAL ID (31235) | SUBSTRATE ASSEMBLY INSPECTION | 2016/9/2 11:00 | INSPECTION STATION OF SUBSTRATE ASSEMBLY FIRST LINE OF SUBSTRATE ASSEMBLY PROCESS | ~ | ~ |
| INSPECTION FACILITY 1 (FACILITY SERIAL ID : 2222) | COMPONENT PART NUMBER(D-001) SERIAL ID (78764) | SUBSTRATE ASSEMBLY INSPECTION | 2016/9/2 11:15 | INSPECTION STATION OF SUBSTRATE ASSEMBLY FIRST LINE OF SUBSTRATE ASSEMBLY PROCESS | ~ | ~ |
| ... | ... | ... | ... | ... | ... | ... |
| FACILITY 2 (FACILITY SERIAL ID : 9999) | PRODUCT PART NUMBER(A-001) SERIAL ID (12345)<br>COMPONENT PART NUMBER(B-001) SERIAL ID (21234)<br>COMPONENT PART NUMBER(F-001) SERIAL ID (21235) | ENTIRE PC ASSEMBLY | 2016/9/2 12:30 | FIRST STATION OF ENTIRE PC ASSEMBLY FIRST LINE OF ENTIRE PC ASSEMBLY PROCESS | ~ | ~ |
| ... | ... | ... | ... | ... | ... | ... |

(GOODS ARRIVAL PLANNING DATA)

TIME-SERIES

| [SUBJECT] | [OBJECT] | [EVENT] | [TIME] | [PLACE] | [CAUSE] | [SITUATION] |
|---|---|---|---|---|---|---|
| (Who) Who | (Whome) Whome | (What) What | (When) When | (Where) Where | (Why) Why | (How) How |
| CPU MANUFACTURING FACTORY | COMPONENT PART NUMBER(E-001) SERIAL ID (313~) CPU | PROCUREMENT REQUESTED | 2016/9/1 | [PC ASSEMBLY FACTORY] THIRD STATION OF SUBSTRATE ASSEMBLY FIRST LINE OF SUBSTRATE ASSEMBLY PROCESS | ~ | PROCUREMENT NUMBER(XXX) |
| MEMORY MANUFACTURING FACTORY | COMPONENT PART NUMBER(F-001) SERIAL ID (412~) 
 | PROCUREMENT REQUESTED | 2016/9/1 | [PC ASSEMBLY FACTORY] THIRD STATION OF SUBSTRATE ASSEMBLY FIRST LINE OF SUBSTRATE ASSEMBLY PROCESS | ~ | PROCUREMENT NUMBER(YYY) |
| ... | ... | ... | ... | ... | ... | ... |

FIG. 11

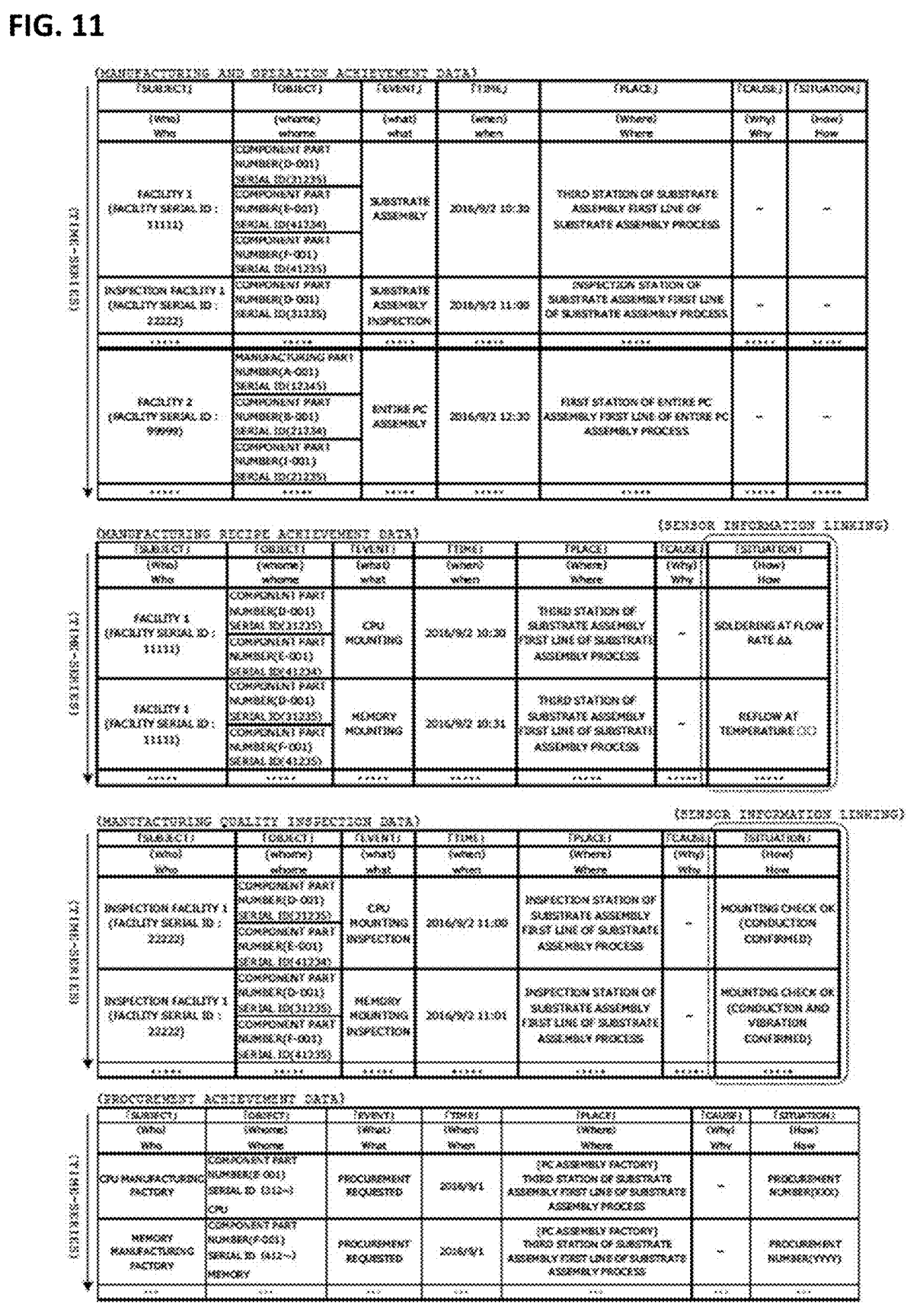

(MANUFACTURING AND OPERATION ACHIEVEMENT DATA)

| {SUBJECT} | {OBJECT} | {EVENT} | {TIME} | {PLACE} | {CAUSE} | {SITUATION} |
|---|---|---|---|---|---|---|
| (Who)<br>Who | (whome)<br>whome | (what)<br>what | (when)<br>when | (Where)<br>Where | (Why)<br>Why | (How)<br>How |
| FACILITY 1<br>(FACILITY SERIAL ID : 11111) | COMPONENT PART NUMBER(D-001) SERIAL ID(31235)<br>COMPONENT PART NUMBER(E-001) SERIAL ID(41234)<br>COMPONENT PART NUMBER(F-001) SERIAL ID(41235) | SUBSTRATE ASSEMBLY | 2016/9/2 10:30 | THIRD STATION OF SUBSTRATE ASSEMBLY FIRST LINE OF SUBSTRATE ASSEMBLY PROCESS | ~ | ~ |
| INSPECTION FACILITY 1<br>(FACILITY SERIAL ID : 22222) | COMPONENT PART NUMBER(D-001) SERIAL ID(31235) | SUBSTRATE ASSEMBLY INSPECTION | 2016/9/2 11:00 | INSPECTION STATION OF SUBSTRATE ASSEMBLY FIRST LINE OF SUBSTRATE ASSEMBLY PROCESS | ~ | ~ |
| ..... | ..... | ..... | ..... | ..... | ..... | ..... |
| FACILITY 2<br>(FACILITY SERIAL ID : 99999) | MANUFACTURING PART NUMBER(A-001) SERIAL ID(12345)<br>COMPONENT PART NUMBER(B-001) SERIAL ID(21234)<br>COMPONENT PART NUMBER(I-001) SERIAL ID(21235) | ENTIRE PC ASSEMBLY | 2016/9/2 12:30 | FIRST STATION OF ENTIRE PC ASSEMBLY FIRST LINE OF ENTIRE PC ASSEMBLY PROCESS | ~ | ~ |
| ..... | ..... | ..... | ..... | ..... | ..... | ..... |

(MANUFACTURING RECIPE ACHIEVEMENT DATA)

(SENSOR INFORMATION LINKING)

| {SUBJECT} | {OBJECT} | {EVENT} | {TIME} | {PLACE} | {CAUSE} | {SITUATION} |
|---|---|---|---|---|---|---|
| (Who)<br>Who | (whome)<br>whome | (what)<br>what | (when)<br>when | (Where)<br>Where | (Why)<br>Why | (How)<br>How |
| FACILITY 1<br>(FACILITY SERIAL ID : 11111) | COMPONENT PART NUMBER(D-001) SERIAL ID(31235)<br>COMPONENT PART NUMBER(E-001) SERIAL ID(41234) | CPU MOUNTING | 2016/9/2 10:30 | THIRD STATION OF SUBSTRATE ASSEMBLY FIRST LINE OF SUBSTRATE ASSEMBLY PROCESS | ~ | SOLDERING AT FLOW RATE AA |
| FACILITY 1<br>(FACILITY SERIAL ID : 11111) | COMPONENT PART NUMBER(D-001) SERIAL ID(31235)<br>COMPONENT PART NUMBER(F-001) SERIAL ID(41235) | MEMORY MOUNTING | 2016/9/2 10:31 | THIRD STATION OF SUBSTRATE ASSEMBLY FIRST LINE OF SUBSTRATE ASSEMBLY PROCESS | ~ | REFLOW AT TEMPERATURE ○○ |
| ..... | ..... | ..... | ..... | ..... | ..... | ..... |

(MANUFACTURING QUALITY INSPECTION DATA)

(SENSOR INFORMATION LINKING)

| {SUBJECT} | {OBJECT} | {EVENT} | {TIME} | {PLACE} | {CAUSE} | {SITUATION} |
|---|---|---|---|---|---|---|
| (Who)<br>Who | (whome)<br>whome | (what)<br>what | (when)<br>when | (Where)<br>Where | (Why)<br>Why | (How)<br>How |
| INSPECTION FACILITY 1<br>(FACILITY SERIAL ID : 22222) | COMPONENT PART NUMBER(D-001) SERIAL ID(31235)<br>COMPONENT PART NUMBER(E-001) SERIAL ID(41234) | CPU MOUNTING INSPECTION | 2016/9/2 11:00 | INSPECTION STATION OF SUBSTRATE ASSEMBLY FIRST LINE OF SUBSTRATE ASSEMBLY PROCESS | ~ | MOUNTING CHECK OK (CONDUCTION CONFIRMED) |
| INSPECTION FACILITY 1<br>(FACILITY SERIAL ID : 22222) | COMPONENT PART NUMBER(D-001) SERIAL ID(31235)<br>COMPONENT PART NUMBER(F-001) SERIAL ID(41235) | MEMORY MOUNTING INSPECTION | 2016/9/2 11:01 | INSPECTION STATION OF SUBSTRATE ASSEMBLY FIRST LINE OF SUBSTRATE ASSEMBLY PROCESS | ~ | MOUNTING CHECK OK (CONDUCTION AND VIBRATION CONFIRMED) |
| ..... | ..... | ..... | ..... | ..... | ..... | ..... |

(PROCUREMENT ACHIEVEMENT DATA)

| {SUBJECT} | {OBJECT} | {EVENT} | {TIME} | {PLACE} | {CAUSE} | {SITUATION} |
|---|---|---|---|---|---|---|
| (Who)<br>Who | (Whome)<br>Whome | (What)<br>What | (When)<br>When | (Where)<br>Where | (Why)<br>Why | (How)<br>How |
| CPU MANUFACTURING FACTORY | COMPONENT PART NUMBER(E-001) SERIAL ID (312~) CPU | PROCUREMENT REQUESTED | 2016/9/1 | (PC ASSEMBLY FACTORY) THIRD STATION OF SUBSTRATE ASSEMBLY FIRST LINE OF SUBSTRATE ASSEMBLY PROCESS | ~ | PROCUREMENT NUMBER(XXX) |
| MEMORY MANUFACTURING FACTORY | COMPONENT PART NUMBER(F-001) SERIAL ID (412~) MEMORY | PROCUREMENT REQUESTED | 2016/9/1 | (PC ASSEMBLY FACTORY) THIRD STATION OF SUBSTRATE ASSEMBLY FIRST LINE OF SUBSTRATE ASSEMBLY PROCESS | ~ | PROCUREMENT NUMBER(YYYY) |
| ... | ... | ... | ... | ... | ... | ... |

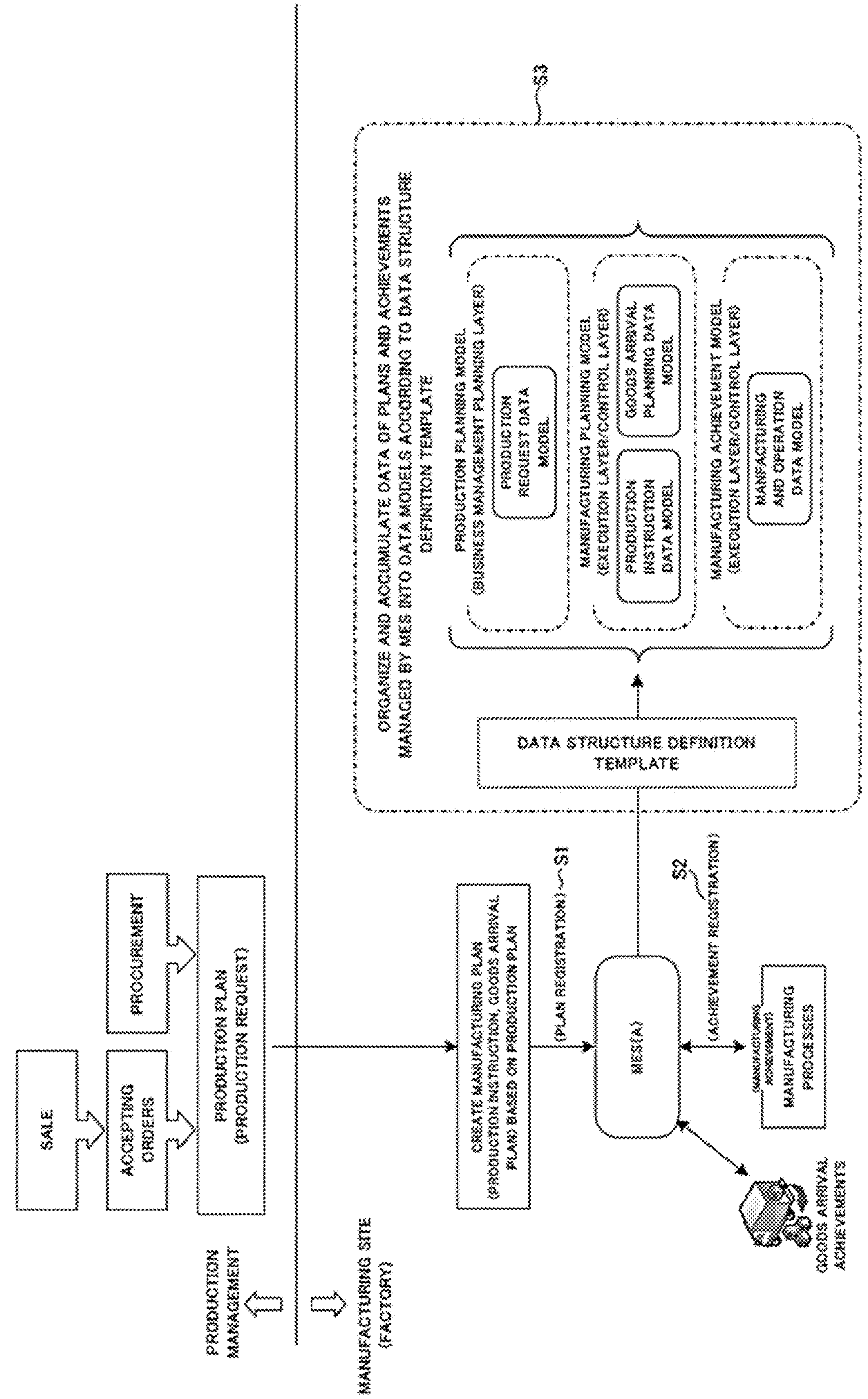

FIG. 12
SALE
ACCEPTING ORDERS
PROCUREMENT
PRODUCTION PLAN (PRODUCTION REQUEST)
PRODUCTION MANAGEMENT
MANUFACTURING SITE (FACTORY)
CREATE MANUFACTURING PLAN (PRODUCTION INSTRUCTION, GOODS ARRIVAL PLAN) BASED ON PRODUCTION PLAN
(PLAN REGISTRATION)
S1
MES(A)
S2
(ACHIEVEMENT REGISTRATION)
(MANUFACTURING ACHIEVEMENT)
MANUFACTURING PROCESSES
GOODS ARRIVAL ACHIEVEMENTS
ORGANIZE AND ACCUMULATE DATA OF PLANS AND ACHIEVEMENTS MANAGED BY MES INTO DATA MODELS ACCORDING TO DATA STRUCTURE DEFINITION TEMPLATE
DATA STRUCTURE DEFINITION TEMPLATE
PRODUCTION PLANNING MODEL (BUSINESS MANAGEMENT PLANNING LAYER)
PRODUCTION REQUEST DATA MODEL
MANUFACTURING PLANNING MODEL (EXECUTION LAYER/CONTROL LAYER)
PRODUCTION INSTRUCTION DATA MODEL
GOODS ARRIVAL PLANNING DATA MODEL
MANUFACTURING ACHIEVEMENT MODEL (EXECUTION LAYER/CONTROL LAYER)
MANFACTURING AND OPERATION DATA MODEL
S3

FIG. 15

FACTORY B (CPU MANUFACTURING FACTORY)

(PRODUCTION INSTRUCTION DATA/ MANUFACTURING ACHIEVEMENT DATA)

(PRODUCTION REQUEST DATA)

| [SUBJECT] (Who) Who | [OBJECT] (Whome) Whome | [EVENT] (What) What | [TIME] (When) When | [PLACE] (Where) Where | [CAUSE] (Why) Why | [SITUATION] (How) How |
|---|---|---|---|---|---|---|
| ~ | PART NUMBER(E-001) | CPU | 2016/9/1 | CPU MANUFACTURING FACTORY | PROCUREMENT NUMBER(XXX) | PRODUCTION VOLUME(1,000 UNITS) |
| ... | ... | ... | ... | ... | ... | ... |
| ~ | PART NUMBER(E-001) | CPU | 2016/10/1 | CPU MANUFACTURING FACTORY | PROCUREMENT NUMBER(ZZZ) | PRODUCTION VOLUME(1,500 UNITS) |

(DATA REFERENCE LINKING)

(REFER TO PRODUCTION PLAN AND ACHIEVEMENTS OF FACTORY B)

FACTORY A (BODY ASSEMBLY FACTORY)

(GOODS ARRIVAL PLANNING DATA)

| [SUBJECT] (Who) Who | [OBJECT] (Whome) Whome | [EVENT] (What) What | [TIME] (When) When | [PLACE] (Where) Where | [CAUSE] (Why) Why | [SITUATION] (How) How |
|---|---|---|---|---|---|---|
| CPU MANUFACTURING FACTORY | COMPONENT PART NUMBER(E-001) SERIAL ID (312~) CPU | PROCUREMENT REQUESTED | 2016/9/1 | [PC ASSEMBLY FACTORY] THIRD STATION OF SUBSTRATE ASSEMBLY FIRST LINE OF SUBSTRATE ASSEMBLY PROCESS | ~ | PROCUREMENT NUMBER(XXX) |
| MEMORY MANUFACTURING FACTORY | COMPONENT PART NUMBER(F-001) SERIAL ID (412~) MEMORY | PROCUREMENT REQUESTED | 2016/9/1 | [PC ASSEMBLY FACTORY] THIRD STATION OF SUBSTRATE ASSEMBLY FIRST LINE OF SUBSTRATE ASSEMBLY PROCESS | ~ | PROCUREMENT NUMBER(YYYY) |
| ... | ... | ... | ... | ... | ... | ... |

(PRODUCTION INSTRUCTION CAN BE CREATED IN RESPONSE TO PRODUCTION REQUEST WHILE CHECKING PRODUCTION PLAN/ ACHIEVEMENTS OF CPU PRODUCED IN FACTORY B)

(PRODUCTION REQUEST DATA)

| [SUBJECT] (Who) Who | [OBJECT] (Whome) Whome | [EVENT] (What) What | [TIME] (When) When | [PLACE] (Where) Where | [CAUSE] (Why) Why | [SITUATION] (How) How |
|---|---|---|---|---|---|---|
| ~ | PART NUMBER(A-001) | PC | 2016/9/30 | PC ASSEMBLY FACTORY | ~ | PRODUCTION VOLUME (1,000 UNITS) |
| ... | ... | ... | ... | ... | ... | ... |
| ~ | PART NUMBER(A-001) | PC | 2016/12/31 | PC ASSEMBLY FACTORY | ~ | PRODUCTION VOLUME (1,500 UNITS) |

INFORMATION MANAGEMENT SYSTEM

TECHNICAL FIELD

Embodiments of the present invention relate to a production management technique for products manufactured in multiple cooperating factories.

BACKGROUND ART

Conventional production management techniques have been provided by utilizing various management systems such as an Enterprise Resources Planning (ERP) system and a Material Resource Planning (MRP) system. In addition, manufacturing sites including factories have employed a Manufacturing Execution System (MES) to manage manufacturing plans and manufacturing achievements.

PRIOR ART DOCUMENTS

Patent Documents

[Patent Document 1] Japanese Patent Laid-Open No. 2009-9188

[Patent Document 2] Japanese Patent No. 6921904

DISCLOSURE OF THE INVENTION

Problems to be Solved by the Invention

It is an object of the present invention to provide an environment in which multiple factories can smoothly share or link the information about production and manufacturing individually managed in multiple factories involved in manufacturing of the same products.

Means for Solving the Problems

An information management system according to an embodiment is applied to production management of products produced in multiple cooperating factories. Each of the factories holds a manufacturing plan including a manufacturing schedule and a manufacturing instruction based on a production management plan, a goods arrival plan relating to procurement from at least one of the other cooperating factories, and achievements of the manufacturing plan and the goods arrival plan, and includes an existing manufacturing management system configured to independently manage plans and achievements of manufacturing in the factory. The information management system includes a storage apparatus configured to store, for each of the factories, data models serving as regions for accumulating the plans and the achievements of manufacturing in the factory, the data models including a production request data model corresponding to the production management plan, a production instruction data model corresponding to the manufacturing plan, and a goods arrival planning data model corresponding to the goods arrival plan; a data accumulation management apparatus configured to structure the plans and the achievements of manufacturing acquired thorough the manufacturing management systems in the factories into the data models according to a data structure definition template constituting of predetermined items and to accumulate the data models; and an information management apparatus configured to refer to information about the plans and achievements of manufacturing in at least one of the other factories via the data models.

BRIEF DESCRIPTION OF THE DRAWINGS

FIG. 2 A diagram for explaining an application of the information management system according to Embodiment 1.

FIG. 5 A diagram showing an example of a production instruction data model according to Embodiment 1.

FIG. 10 A diagram showing examples of a production request data model, a production instruction data model, and a goods arrival (procurement) plan data model according to Embodiment 1.

FIG. 11 A diagram showing examples of manufacturing and operation achievement data, manufacturing recipe achievement data, manufacturing quality inspection data, and procurement achievement data according to Embodiment 1.

FIG. 12 A diagram showing a flow of processing in the information management system according to Embodiment 1.

FIG. 15 A diagram showing an example of inter-factory information linking according to Embodiment 1.

MODE FOR CARRYING OUT THE INVENTION

Figure 1:
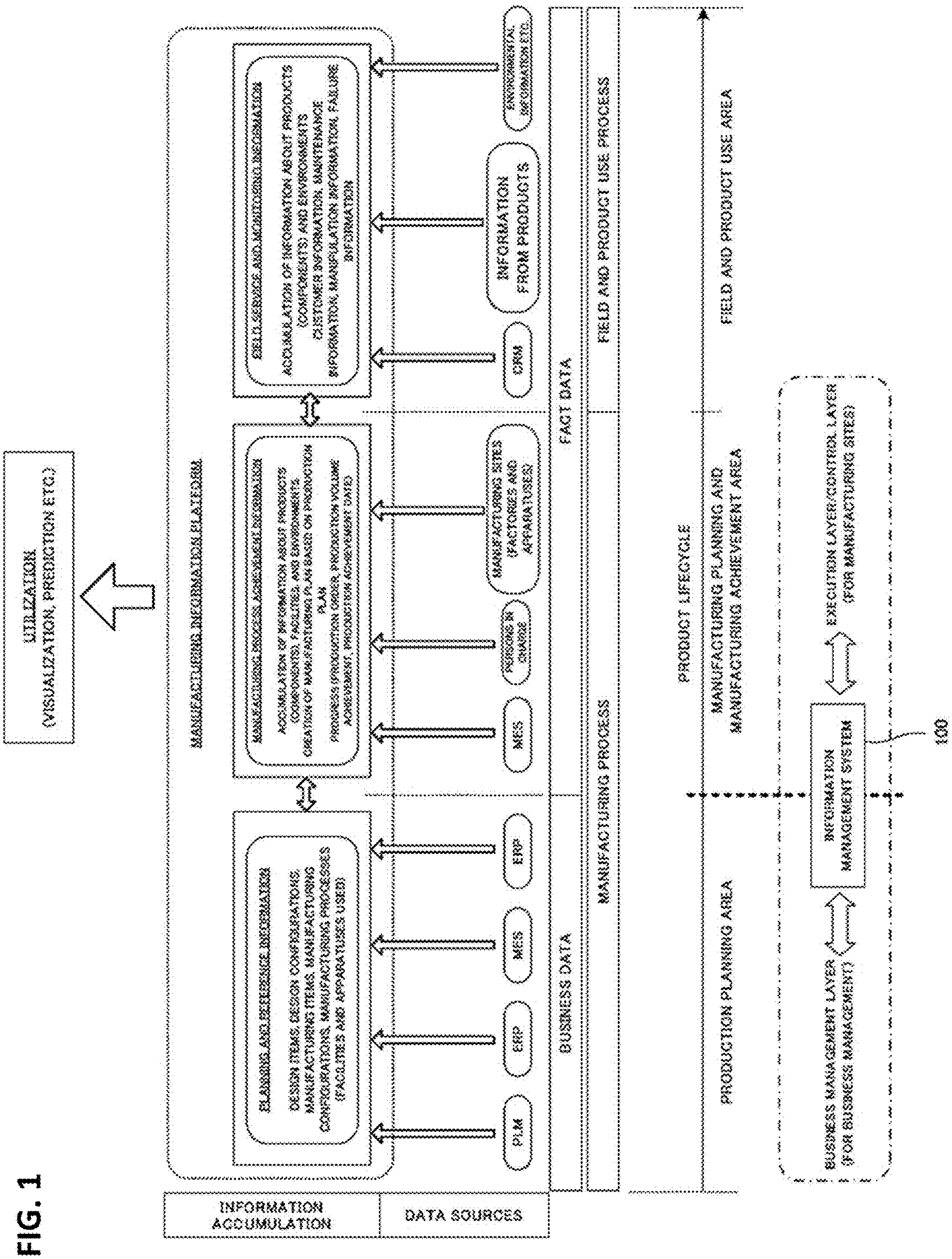
FIG. 1 A conceptual diagram showing an information management system according to Embodiment 1.

An embodiment of the present invention is hereinafter described with reference to the accompanying drawings.

As described above, the systems such as the ERP and MES manage information to streamline business management and production (manufacturing). In reality, however, information sharing and information linking present difficult challenges.

For example, a business management layer creates a production management plan of products from a viewpoint of the number of products put on the market per month, and a manufacturing site layer (factories) creates, based on the production management plan created by the business management layer, a production instruction (manufacturing schedule and manufacturing instruction) specifying the number of products to be manufactured on the present day and creates a manufacturing timeline plan (manufacturing plan) for the products. The manufacturing site layer has existing manufacturing management systems introduced to independently manage manufacturing plans and achievements in factories, and the MES is a representative one of those systems.

The MES introduced in the factories, however, does not manage the information with the same database structure, data types, data items, and units at the factories. In addition, different pieces of information are managed for different items to be manufactured, or the same information is managed but has different data types, items, time spans (each day, each hour etc.), and units.

Thus, the system is generally called "MES," but more specifically, the factories use independent MESs to manage manufacturing processes, make their own efforts to increase the manufacturing efficiency, and customize the systems as required. In fact, the manufacturing sites at the factories often perform manufacturing management in their own manners.

Products may not be manufactured in only one factory. For example, parts are manufactured in a factory A and then assembled in a factory B. To track the progress and other statuses compared with the production management plan from the business management layer, information needs to be acquired from the respective factories. It may be difficult, however, to share and link the information individually managed by the factories as described above.

For example, the factories may manage data items holding the same information but having different names. The factory A may manage a data item of "manufactured item," the factory B may manage a data item of "Serial No," and a factory C may manage a data item of "unique number," but those data items may store the same identification information. In this case, to find this information, it is necessary to know in advance that the same identification information is managed as the data item of "manufactured item" at the factory A, as the data item of "Serial No" at the factory B, and as the data item of "unique number" at the factory C.

In another example, time management may be performed in a data item of "time" at the factory A and in a data item of "work start time" at the factory B. In particular, different time formats or perspectives may be used at the different factories and, depending on them, different ways of information retrieval (different ways of information management) may be used. For example, when the work start time is important, the work finish time may not be managed as a data item, or only the time-series data of the manufacturing process may be held and thus the work start time may not be recognized at one view.

Yet another example is numerical value information. For example, the factory A may manage current values in milliamperes and the factory B may manage them in microamperes. In this case, the information is not correctly known only from the numerical values.

As described above, when the multiples factories are involved, the information individually managed at the manufacturing sites need to be found and correctly acquired by previously knowing and analyzing the different forms of information management at the respective manufacturing sites, which requires large amounts of labor. The production management plan from the business management layer and the production instruction (manufacturing plan) from the manufacturing site layer seem to be easily associated, but actually, the association is difficult.

When the factory B uses parts manufactured in the factory A, the manufacturing plan in the factory B is affected by the schedule of arrival of the parts from the factory A, that is, the manufacturing plan and achievement in the factory A. The factory B can efficiently create the manufacturing plan by taking account of the progress at the factory A when making the manufacturing plan. This requires previous knowledge and analysis of the form of information management employed at the factory from which the information is acquired, but the information sharing between the factories is difficult.

While various systems have conventionally been proposed for facilitating information sharing and information linking, factories employ uniquely adapted manufacturing management systems such as the MES in terms of improved manufacturing efficiency and quality. In addition, one factory may process multiple products or parts managed in different forms. Thus, the factories need to perform individual manufacturing management operations as appropriate for items to be manufactured or management approaches, so that it is impractical for the factories to introduce and manage a unified MES to facilitate information sharing and information linking.

To address such conventional issues, an information management system according to the present embodiment achieves an environment which allows smooth information sharing and information linking on the assumption that a manufacturing management system such as an existing MES is used to individually manage manufacturing plans and achievements at factories.

Various types of data about manufacturing at factories are often secretly managed techniques, know-how, and information, managed in a closed manner at the factories, and carefully provided to the outside. For smooth information sharing and information linking between the factories, it is necessary to have an access right to information resources, that is, data reference limit control. The information management system according to the embodiment provides a function of data reference limit control and also provides a function of relaying information sharing and information linking to multiple factories (hub function).

Embodiment 1

FIG. 1 is a conceptual diagram showing the information management system according to Embodiment 1. A product lifecycle starts from planning and design of products in the business management layer, passes through production (manufacturing) of the products in the manufacturing site layer (factories), then to operation, use, and maintenance at the market (field and product use). The overall product lifecycle can be segmented into three area including a production planning area (business management layer), a manufacturing planning and achievement area (manufacturing site layer such as factories), and a field and product use area (including information which represents product use statuses (ways of use) and environmental information). Various types of information are collected from data sources in each of the areas. The product lifecycle shown in FIG. 1 is not limited to domestic manufacturing but is applicable to domestic and international manufacturing, and thus the information management system according to Embodiment 1 is applicable to factories located domestically and internationally over networks.

The information management system according to Embodiment 1 can be implemented as part of a management system which covers the overall product lifecycle or implemented as a system which covers the production planning area (business management layer) and the manufacturing planning and achievement area of the overall product life-cycle to provide an information platform for achieving smooth information sharing and information linking between the business management layer and the manufacturing site layer and between the manufacturing site layers.

The production planning area mainly corresponds to the region of "business data" to manage information treated in the business management layer. As described above, the business management layer creates the production management plan (production request to the manufacturing site layer) from a viewpoint of the number of products put on the market per month. For the created production management plan, planning and reference information is managed such as procurement management information for managing suppliers of materials and parts, and manufacturing parameters and manufacturing recipes based on product specifications.

The manufacturing planning and achievement area and the field and product use area correspond to the region of "fact data." The "fact data" refers to fact and achievement information of a manufacturing process and fact and achievement information of a field and product use process. The field and product use process can include an operation and maintenance service for manufactured and sold products (field service) and a monitoring service of collecting and monitoring information about statuses and environments in which the products are used. This can build a tracking route for tracking the products after they are put on the market, in other words, for tracing back to the manufacturing planning and achievement area from the products put on the market.

FIG. 2 is a diagram for explaining an application of an information management system 100 according to Embodiment 1. As shown in FIG. 2, factories include existing manufacturing management systems (for example, MESs) to individually manage manufacturing plans and achievements, and create production instructions and goods arrival plans based on a production manufacturing plan created in the business management layer, and manage them with the existing MESs. The production instruction refers to a manufacturing plan including a manufacturing schedule and a manufacturing instruction. The MES holds the created manufacturing plan and receives input of manufacturing achievements provided from manufacturing processes (facility equipment or apparatuses in the manufacturing processes) to manage plans and achievements of products.

The goods arrival plan at a factory refers to a procurement plan for materials to be used in the factory or parts manufactured in another factory to manage plans and achievements of goods arrival. As shown in the example of FIG. 2, when multiple factories cooperate such that a factory B uses parts manufactured in a factory A, the goods arrival plan at the factory B is created based on the manufacturing plan at the factory A, and the goods arrival achievement at the factory B is created based on the manufacturing achievement at the factory A. In this manner, the information of one factory can be associated with the information of the other factory.

The factory A is provided with an information management system 100A for an MES (A) and the factory B is provided with an information management system 100B for an MES (B). The information management systems 100A, 100B are connected to each other over a network. In this manner, the information management systems 100A, 100B are provided as a common information platform level for the existing MESs at the factories. This allows information acquired from the factories or information passed between the factories to be treated on the common platform independently of the MESs introduced at the factories, thereby facilitating information sharing and information linking.

Figure 3:
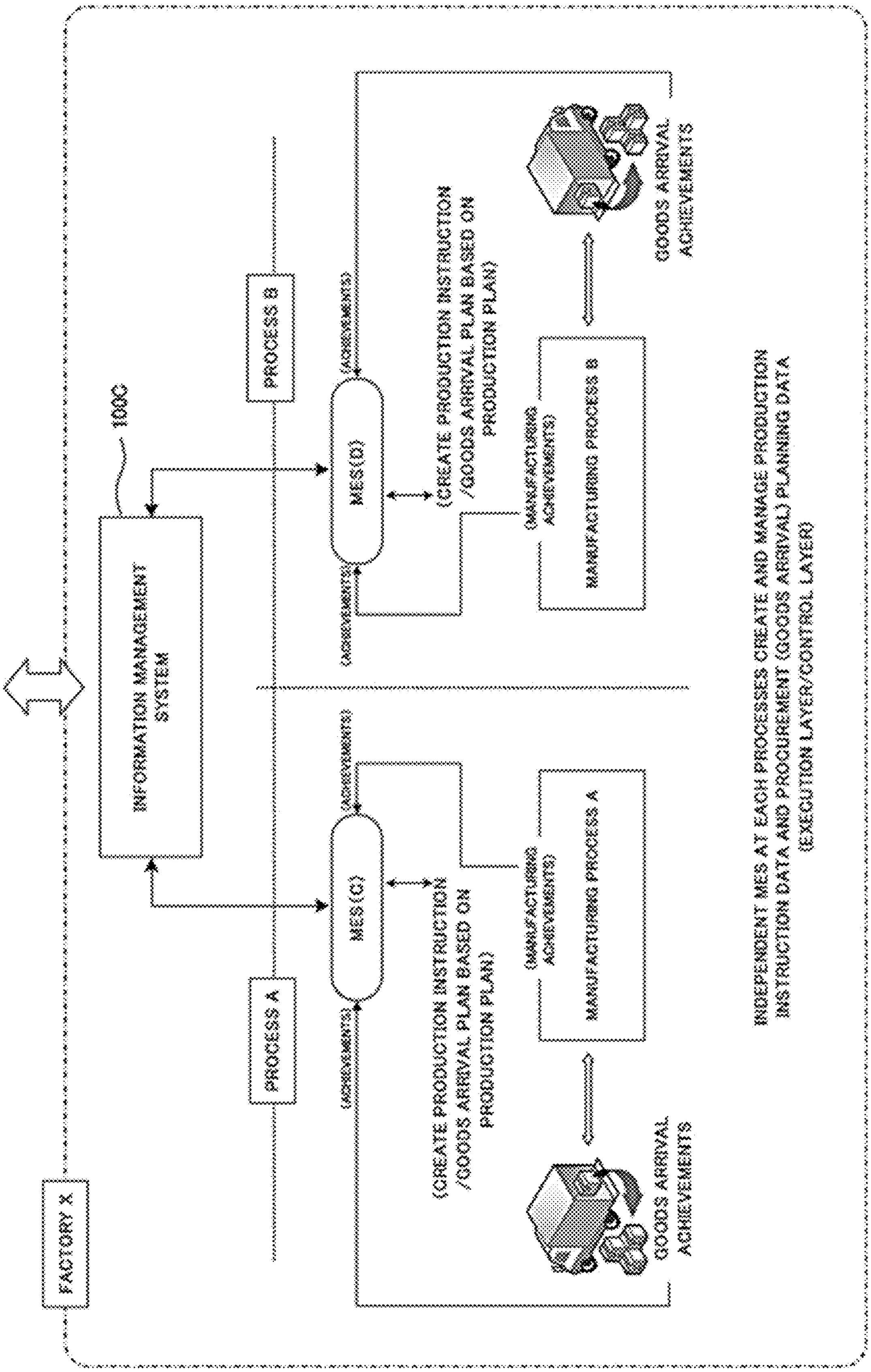
FIG. 3 A diagram for explaining an application of the information management system according to Embodiment 1.

FIG. 3 is a diagram showing an application of the information management system 100 according to another aspect of MESs introduced at a factory. A factory may include multiple manufacturing processes (manufacturing lines) and these different manufacturing processes may involve different items to be manufactured or different management approaches. In this case, different MESs may be introduced for the respective manufacturing processes. The example of FIG. 3 shows that, in a factory A, a manufacturing process A is managed by an MES (C) and a manufacturing process B is managed by an MES (D). Similarly to the example of FIG. 2, the information management system 100 can be applied to each of the MESs for the respective manufacturing processes, or as shown in FIG. 3, one information management system 100 can be associated with multiple MESs.

Figure 4:
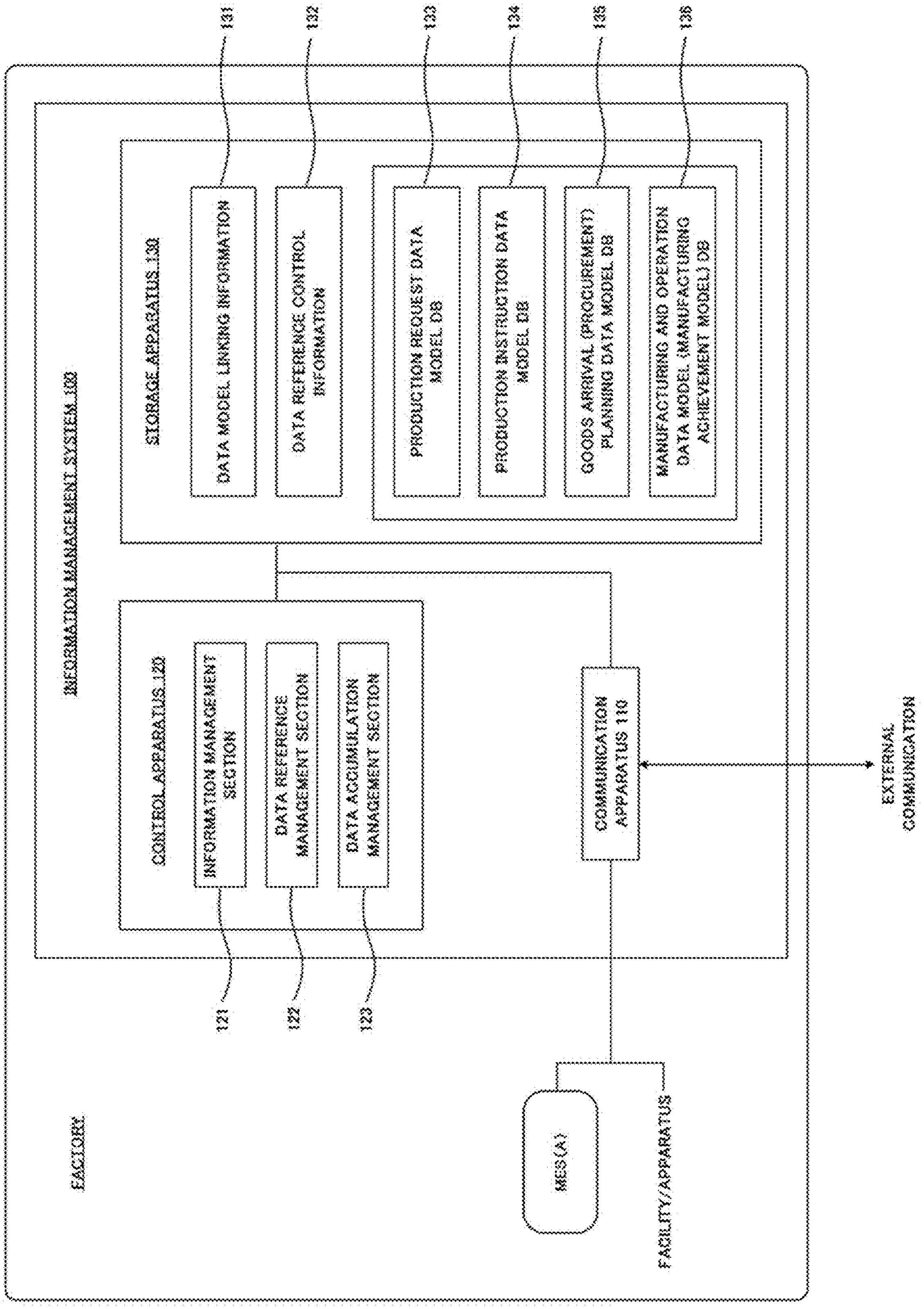
FIG. 4 A block diagram showing functions of the information management system according to Embodiment 1.

FIG. 4 is a block diagram showing functions of the information management system 100. The information management system 100 includes a communication apparatus 110, a control apparatus 120, and a storage apparatus 130.

The communication apparatus 110 is connected to MESs at factories or facility equipment and apparatuses in manufacturing processes to perform data communication control.

The control apparatus 120 includes an information management section 121, a data reference management section 122, and a data accumulation management section 123.

The storage apparatus 130 stores data model linking information 131, data reference control information 132, a production request data model 133, a production instruction data model 134, a goods arrival (procurement) planning data model 135, and a manufacturing and operation data model 136.

First, description is made of a mechanism to accumulate data according to Embodiment 1 that forms the basis of the information platform. In Embodiment 1, data models serving as regions for accumulating manufacturing plans and achievements at factories are prepared in the storage apparatus 130. Information about manufacturing plans and achievements accumulated and managed in the MES is extracted (selected) according to a data structure definition constituting of predetermined items including "subject (Who)," "object (Whom)," "event (What)," "time (When)," "place (Where)," "and "situation (How)" (5W1H), and then structured into the data models and accumulated. It should be noted that the data structure definition may consist of 6W1H additionally including "cause (Why)" to accumulate information when products or facilities suffer from any problem. Description is made herein of an example of the data structure definition of 6W1H.

For example, FIG. 5 shows an example in which data of manufacturing plans and manufacturing achievements accumulated in the MES is organized in association with the data structure definition and accumulated in the production instruction data model. The data structure definition is a template for organizing and accumulating subjects of data sources as "subject" and what ("event") performed by "subject" to which object. The information management apparatus 100 collects information from a facility 1 corresponding to a data source via the MES. The facility 1 operates in a manufacturing process based on the manufacturing plan, and its operation achievements are collected by the MES in real time. The operation works performed during the manufacturing process in the facility 1 and the state and status of the operation works are organized according to the data structure definition template. As shown in FIG. 5, the achievements are created such that the facility 1 (subject) performed substrate assembly (event) on products having certain manufacturing part numbers (object).

Records created according to the data structure definition are chronologically accumulated in the data model. In other words, in Embodiment 1, the information about manufacturing process achievements is recorded in the form of time-varying records (6W1H) organized according to the data structure definition.

Although the items of 6W1T are defined in the data structure definition, the created record may not include all the items. For example, the production instruction data model shown in FIG. 5 can be created as a record which does not include the items "cause (Why)" or "situation (How)." Alternatively, the record may be created to include all the items and, each time information is collected from a data source, the information fills in the corresponding item, so that the created record may include any blank item.

The data accumulation management section 123 of the information management system 100 structures manufacturing plans and manufacturing achievements acquired from the existing manufacturing management system (MES) in the factory into data models 133, 134, 135, 136 according to the data structure definition template and accumulates them. The information management system 100 previously holds information about database structures, data items, and units of data accumulated in the MES as the data model linking information 131. The data accumulation management section 123 refers to the data model linking information 131 to accumulate the data in the data models 133, 134, 135, 136 according to the data structure definition template.

The information management section 121 includes a screen application function for referring to information via the data models 133, 134, 135, 136. The information management section 121 also serves as a screen application for referring to information acquired from data models 133, 134, 135, 136 in other factories.

Figure 6:
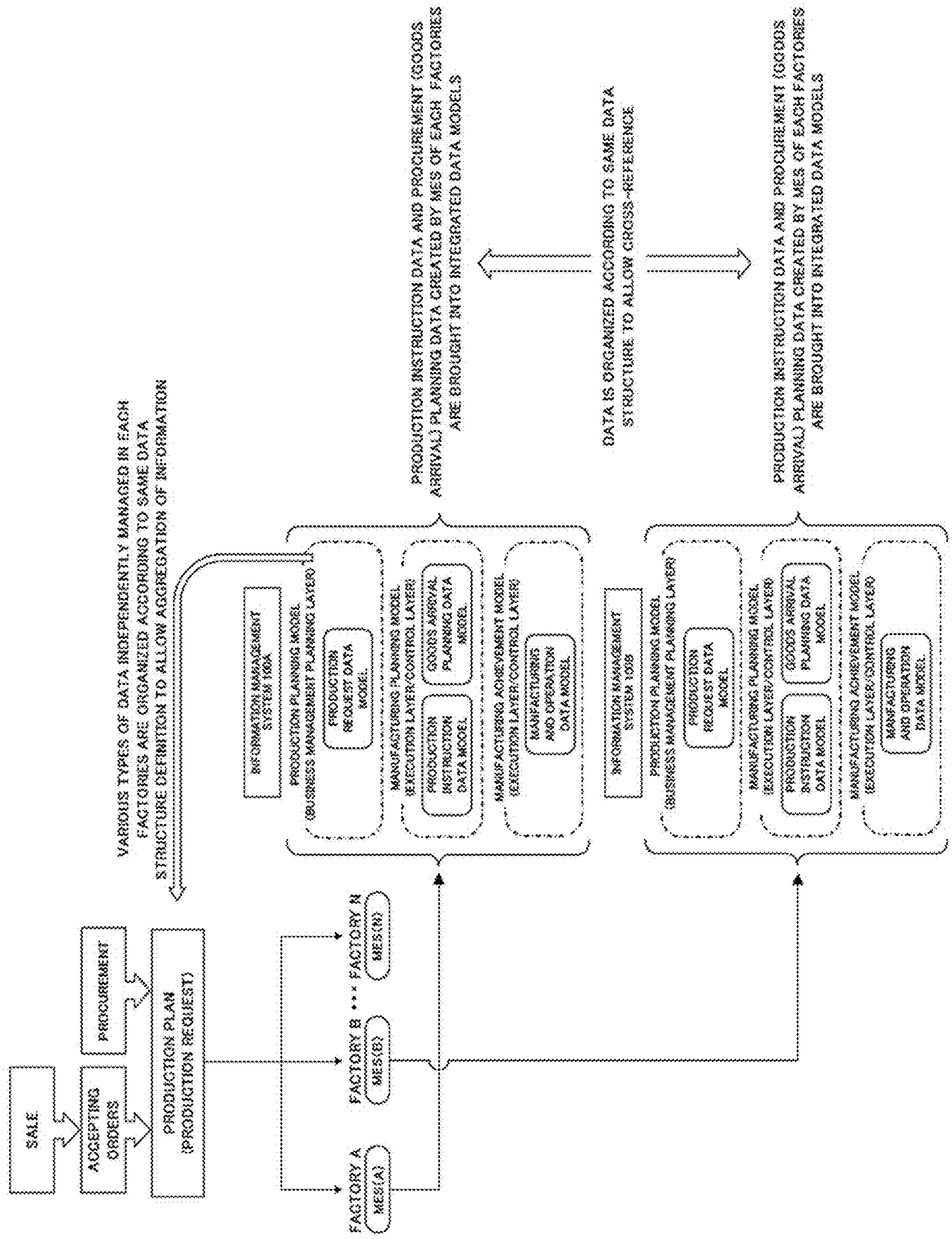
FIG. 6 An explanatory diagram for an information platform in which the information management system according to Embodiment 1 is used.

FIG. 6 is an explanatory diagram for an information platform in which the information management system 100 according to Embodiment 1 is applied to production management of products to be produced in multiple cooperating factories.

Information management systems 100A, 100B, . . . 100N are provided for respective factories, in which data models are prepared as regions for accumulating manufacturing plans and achievements at the factories. In each of the factories, the storage apparatus 130 stores the production request data model corresponding to the production management plan created in the business management layer, and the production instruction data model corresponding to manufacturing plan and the goods arrival planning data model corresponding to the goods arrival plan created in the factory.

The data models 133, 134, 135 serve as "containers" for structuring and accumulating the information according to the same data structure definition template. The factories, in other words, the information management systems 100A, 100B use the integrated data structure definition template to structure and accumulate the information, and thus the common information platform is formed.

The various types of data independently managed by the MES in each factory are organized according to the same data structure definition, so that the information from the factories can be easily aggregated without previously knowing and analyzing different forms of information management at the respective factories. Similarly, information linking between the factories can be readily performed to allow information reference since it is not necessary to previously know and analyze the form of information management at the factory from which information is acquired.

Figure 7:
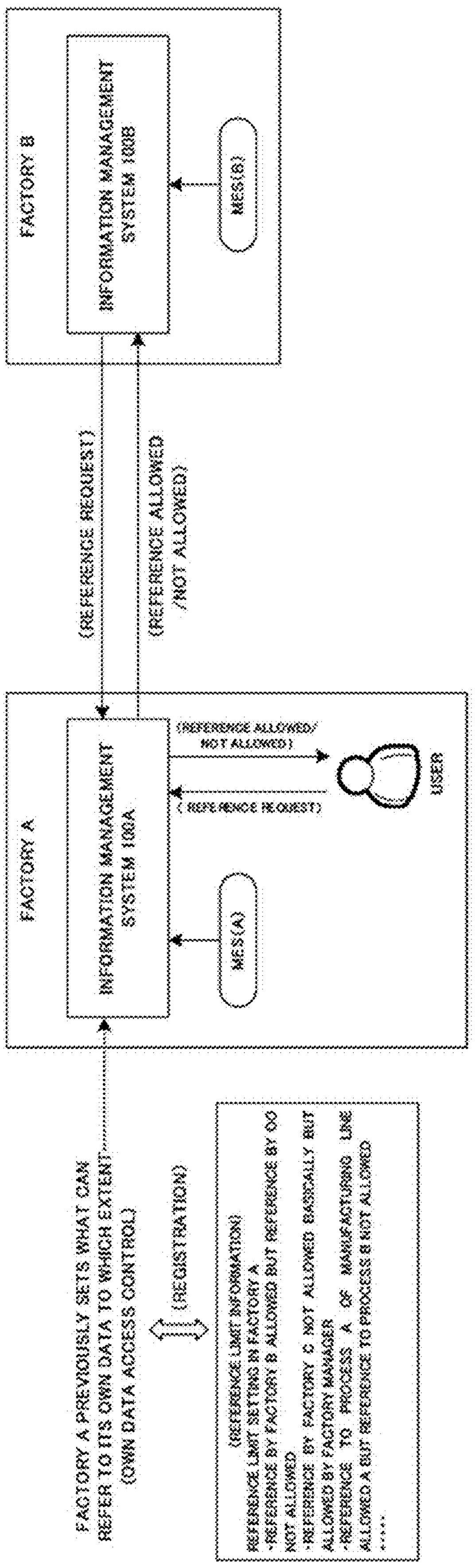
FIG. 7 A diagram for explaining a data reference function of the information management system according to Embodiment 1.
Figure 8:
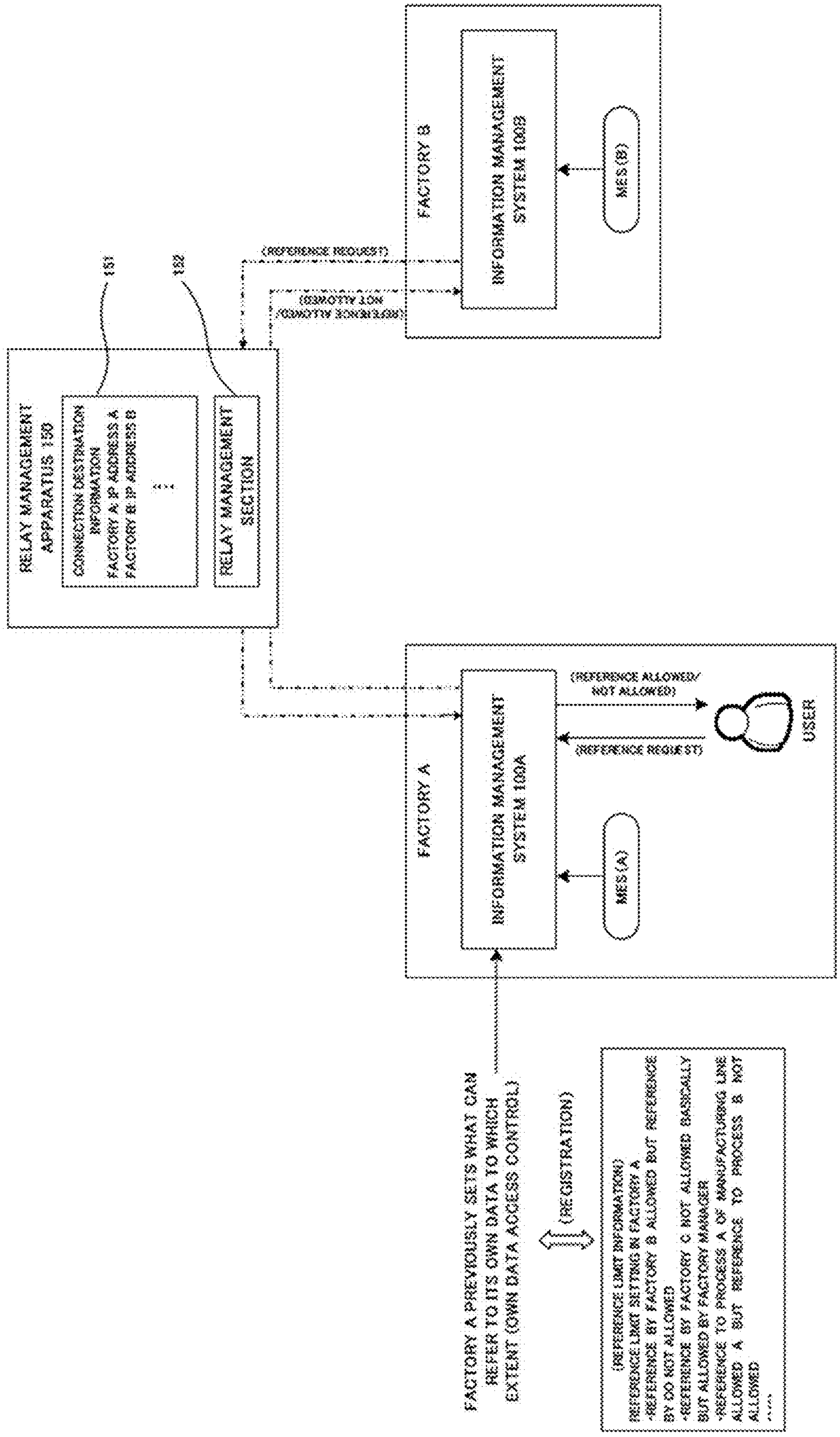
FIG. 8 A diagram for explaining the data reference function of the information management system according to Embodiment 1.

FIGS. 7 and 8 are diagrams for explaining a data reference function of the information management system 100. First, description is made of the data reference function common to FIGS. 7 and 8. The data reference management section 122 of the information management system 100 performs reference limit control (own data access control) by previously setting what can refer to its own data to which extent. Specifically, the data reference management section 122 sets first reference limit information indicating an information disclosure range provided for users in its own factory and second reference limit information indicating an information disclose range provided for users in other factories. The set reference limit information is stored in the storage apparatus 130.

Examples of the first reference limit information include "reference to process A of manufacturing line allowed but reference to process B not allowed," "reference by manager A allowed but reference by employees on temporary assignment not allowed," and "reference by employee OO to process A of manufacturing line allowed but reference to process B not allowed."

Examples of the second reference limit information include "reference by factory B allowed but reference to data of manufacturing line OO not allowed," "reference by factory C not allowed basically but reference by factory manager allowed," and "reference by factory D to data of process A of manufacturing line allowed but reference to data of process B not allowed."

When a user at a factory (each data model of the factory) wants to view the manufacturing plan and manufacturing achievement of a certain manufacturing process through the information management section 121, the data reference management section 122 of Embodiment 1 performs user authentication and reference limit control based on the first reference limit information. In response to determination of reference allowed as a result of the user authentication, the data reference management section 122 allows acquisition of (some or all of) data from the data models for use in screen display processing of the information management section 121. Alternatively, in response to determination of reference not allowed as a result of the user authentication, the data reference management section 122 prevents acquisition of (some or all of) data from the data models for use in screen display processing of the information management section 121. For example, when all of data reference is not allowed in screen display processing of the information management section 121, the data reference management section 122 can perform control to prevent display of all of the associated data analysis results. When some of data reference is not allowed, the data reference management section 122 can perform control to prevent display of some of the associated data analysis results.

The data reference management section 122 of Embodiment 1 at a factory transmits an information reference request to another factory to which it wants data reference. Also, in response to reception of an information reference request from another factory which wants data reference, the data reference management section 122 performs reference limit control based on the second reference limit information. The reference limit control based on the second reference limit information corresponds to control of access to external communication, in which the factory sets and controls the information disclosure range provided for another factory to allow management of secretly managed techniques, know-how, and information at its own judgment.

As described above, the data reference management section 122 performs the internal reference limit processing on the information about the manufacturing plan and achievement in the factory via the data models based on the first reference limit information, and performs the external reference limit processing on the information about the manufacturing plan and achievement in the factory via the data models based on the second reference limit information. FIG. 7 shows a specific aspect in which information management systems 100A, 100B in the respective factories directly link information over a network.

FIG. 8 shows an aspect in which a hub function is provided for relaying information sharing or information linking to multiple factories. For example, the information management system 100 can include a relay management apparatus 150. The relay management apparatus 150 stores destination IP addresses (connection destination information 151) of information management systems 100A, 100B, . . . , 100N in respective factories. A relay management section 152 performs connection control to receive an information reference request from one factory to another factory and connect to the information management system 100 in the other factory corresponding to the reference request target with the associated destination IP address.

In response to determination of reference allowed as a result of the above data reference limit processing by the reference request target, the relay management section 152 performs relay control to receive information of manufacturing plan and manufacturing achievement based on the data model provided by the information management system 100 of the reference request target and transmit the received information to the information management system 100 in the factory which issued the information reference request. Alternatively, in response to determination of reference not allowed as a result of the above data reference limit processing by the reference request target, the relay management section 152 transmits the result of inquiry indicating the reference not allowed to the information management system 100 in the factory which issued the information reference request.

As shown in FIG. 8, the relay management apparatus 150 can be configured as an apparatus external to the information management systems 100 or configured to be incorporated into any one of the information management systems 100 in the factories.

The hub function for information sharing and information linking can be provided as described above to allow the factories to perform mutual data reference without sharing connection destination information. In response to reception of the reference request from the relay management apparatus 150, the factory only needs to transmit back the manufacturing plan and achievement stored in the data model based on the data reference limit processing. This eliminates the need to perform data communication to each of the factories, thereby simplifying the information providing function of the information management system 100.

Figure 9:
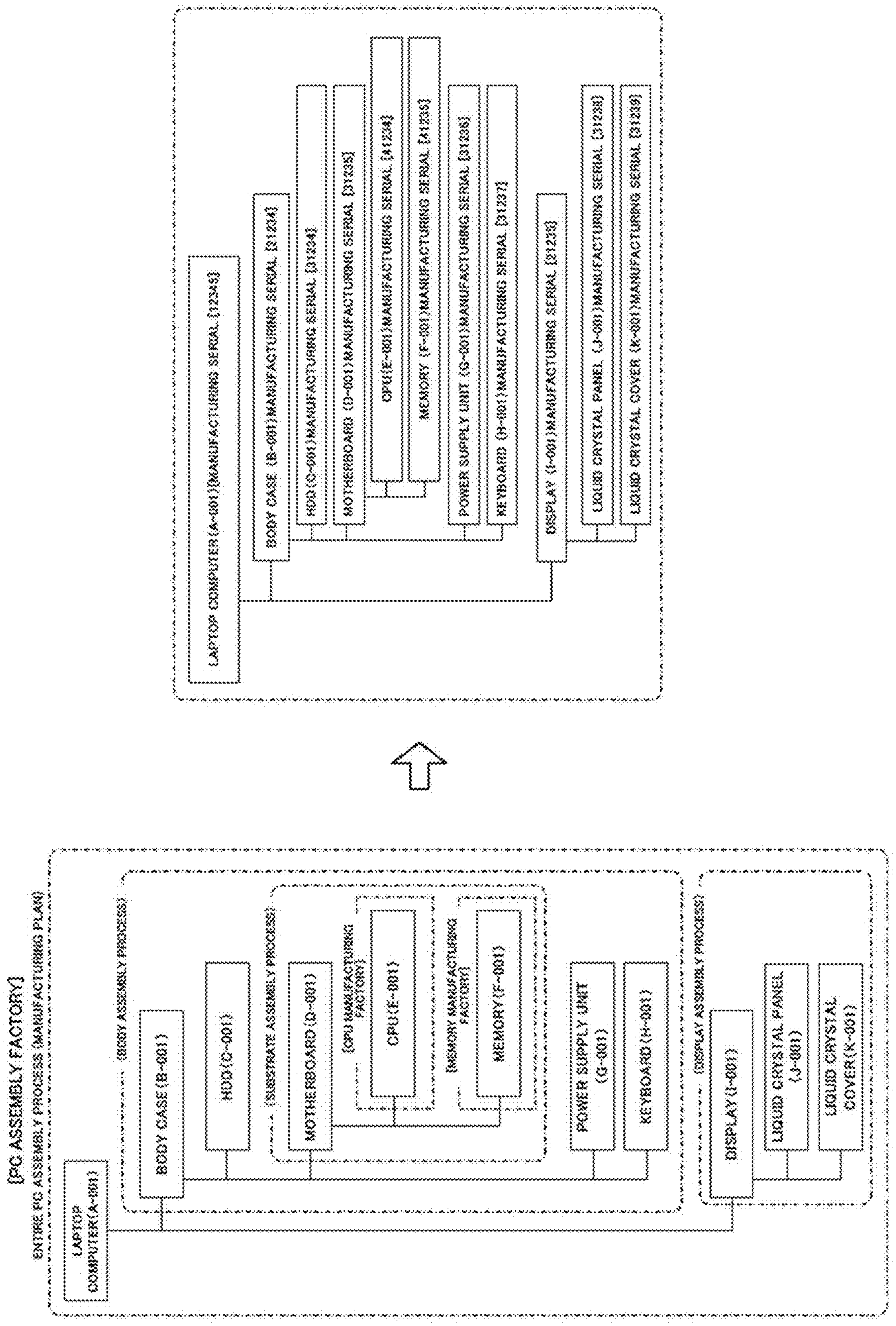
FIG. 9 A diagram showing examples of a manufacturing plan and a manufacturing serial IDs associated with an assembly process of an entire PC according to Embodiment 1.

Detailed description is now made of the data models according to Embodiment 1 with reference to FIGS. 9 to 11.

As shown from FIGS. 1 to 6, the business management layer plans and designs products to make the production management plan of the products. Then, factories in the manufacturing site layer make the manufacturing plan based on the production management plan. The manufacturing plan is mainly used to determine manufacturing processes for manufacturing the products, components constituting the products, facility equipment for use in the manufacturing processes, and manufacturing parameters (manufacturing recipe) in the facility equipment.

The MES manages the information including the production management plan and manufacturing plan of the products and manages resource information about manufacturing facilities (manufacturing lines) possessed by the factories. The resources at the manufacturing sites can be managed using master information including facility serial IDs assigned to places and facilities (or manufacturing lines).

The manufacturing plan corresponds to specifications of products during manufacturing processes until completion. The manufacture plan can be provided with the resource information about manufacturing facilities to determine "at which facility in which place," "for which object," and "how to perform what." The manufacturing plan can also include the goods arrival plan about procurement of materials or parts supplied from the other cooperating factories to determine "from what factory" and "by the time when" the materials or parts arrive as planned values. The production management plan (received order) in the business management layer is used to optimize "from when" each manufacturing process is started, and then the manufacturing process is started at the manufacturing site.

FIG. 9 shows an example of the manufacturing plan associated with an assembly process of an entire PC. In the example of FIG. 9, the assembly process of the laptop computer mainly includes a body assembly process and a display assembly process, and the body assembly process includes a substrate assembly subprocess. Each of the processes and subprocess is associated with a component (part) in a hierarchy structure.

FIG. 10 is a diagram showing examples of the production request data model 133, the production instruction data model 134, and the goods arrival (procurement) planning data model 135. The production request data model 133 corresponds to a data region for accumulating the production management plan of the business management layer. The production instruction data model 134 and the goods arrival planning data model 135 correspond to a data region for accumulating the manufacturing plan.

The actual manufacturing achievements and operation achievements of facility equipment are accumulated in comparison with the manufacturing plan. FIG. 11 is a diagram showing exemplary achievement records accumulated in a manufacturing achievement model. An upper stage in FIG. 11 shows an example of manufacturing and operation achievement data.

Now, description is made of the relationship between plan and achievement. In the manufacturing and operation achievement data, information collected and accumulated from facility equipment managed by the MES is "object" and "time," and the remaining data "subject," "event," and "place" are information previously created in the manufacturing plan. Specifically, in a manufacturing process at the facility 1, a manufacturing plan relating to manufacturing and operation is previously created such that the facility 1 (subject) should start motherboard substrate assembly (event) in a third station of a first line (place) at "10:30 on September second, 2016" (time), and in comparison with this plan, the achievement values "object" and "time" are accumulated as an achievement record. In a manufacturing process at a facility 2, a manufacturing plan relating to manufacturing and operation is previously created such that the facility 2 (subject) should start entire laptop computer assembly (event) in a first station of the first line (place) at "12:30 on September second, 2016" (time).

Specifically, for manufacturing of the laptop computer having a manufacturing part number (A-001) and a serial ID (12345), information is saved to show that the facility 1 (subject) started the manufacturing of a motherboard having a component part number (D-001) and a serial ID (31235) at 10:30 on September second, 2016 as planned, mounted a CPU having a component part number (E-001) and a serial ID (41234), and mounted a memory having a component number (F-001) and a serial ID (41235), as shown by "object" shown in the manufacturing and operation achievement data of FIG. 11. In addition, information is saved to show that the facility 2 (subject) started the manufacturing of the laptop computer having the manufacture part number (A-001) and the serial ID (12345) at 12:30 on September second, 2016 as planned, and assembled a body case having a component part number (B-001) and a serial ID (21234) and a display having a component number (I-001) and a serial ID (21235). In this manner, the information provided in the manufacturing plan can be used to organize and accumulate the data according to the data structure definition based on "6W1H." It should be noted that the data organization and accumulation may be performed in any manner as long as the information about manufacturing process achievements can be recorded in the form of time-varying records (6W1H) organized according to the data structure definition as described above.

The "subject" representing the achievement values accumulates identification information including the manufacturing part numbers and serial IDs (individual identification information). With reference to the example of FIG. 9, the manufacturing part number indicates "laptop computer." A desktop PC can be assigned another manufacturing part number. The serial ID is individual identification information for uniquely identifying multiple laptop computers such that different numbers are assigned to different laptop computers. Similarly, the component part number is a part number common to components of one type, and the serial ID is a unique and different ID assigned to each of the components.

The manufacturing part number and the serial ID (individual identification information) can be combined into a set to uniquely specify products and their components. The serial ID is read or given to be accumulated as the achievement value in the achievement data. For example, during mounting of CPUs onto motherboards, the facility 1 can read the unique serial IDs previously assigned to the respective CPUs through barcodes and can accumulate the read serial IDs in the achievement data in association with the manufacturing part number.

The detailed achievements of the objects in the manufacturing and operation achievement data are stored in manufacturing recipe achievement data shown in FIG. 11. In the manufacturing recipe achievement data, information collected and accumulated from the facility equipment managed by the MES is the actually measured values of "object," "time," and "situation (manufacturing parameters), and the remaining data "subject," "event," and "place" are consistent with the previously created manufacturing plan. Specifically, the manufacturing plan specifies that the facility 1 corresponds to a substrate assembly line and should start manufacturing processes of "mounting of CPUs onto motherboards" and "mounting of memories onto the motherboards" in the third station at predetermined times and perform the mounting and placement in a manner necessary for them. In comparison with the manufacture plan, the achievement values "object," "time," and "situation" are organized and accumulated according to the data structure definition to provide the manufacturing recipe achievement data.

Specifically, as shown in the manufacturing recipe achievement data of FIG. 11, the achievement data is stored in which the CPU having the component part number (E-001) and the serial ID (41234) corresponding to the object of the manufacturing and operation achievement data was soldered and mounted onto the motherboard having the component part number (D-001) and the serial ID (31235) at a flow rate AA at 10:30 on September second, 2016 (situation).

In the manufacturing recipe achievement data, sensor values detected in real time are accumulated in "situation." The sensor values refer to sensor information output from a sensor device provided for the facility 1 or sensor information output from a sensor device separately provided from the facility 1 for acquiring the situation of the facility 1.

The sensor information includes a group of sensor values detected in chronological order at predetermined time intervals. "Situation" of the manufacturing recipe achievement data includes the average value or median value of the group of sensor values arranged in chronological order, or the representative value detected at a predetermined time. Data from the group of sensor values can be stored in the storage apparatus 130 in association with the manufacturing process "CPU mounting" or "memory mounting." The sensor information includes sensor values output from facility equipment in each manufacturing process or sensor values necessary for manufacturing and inspection, and includes time-series elements.

Returning to FIG. 9, the accumulation of manufacturing and operation achievement data as described above creates manufacturing serial Bill Of Materials (BOM) for each product from the manufacturing plan (production instruction data) shown in FIG. 10. The manufacturing serial BOM includes uniquely associated serial IDs of components of each product in a hierarchy structure. The manufacturing serial BOM allows users to see a family tree of multiple components constituting each product.

The manufacturing and operation achievement data also includes an inspection process in an inspection facility 1. Specifically, for the motherboard serving as the object in the manufacturing and operation achievement data shown in FIG. 11 and having the manufacturing part number (D-001) and the serial ID (31235), the manufacturing plan relating to manufacturing and operation is previously created such that the inspection facility 1 should start, as an inspection process in the inspection facility 1, inspections for CPU and memory mounting in an inspection station of the first line at "11:00 on September second, 2016", and in comparison with this plan, the achievement values "object," "time," and "situation" representing the inspection results are accumulated to provide the manufacturing and operation achievement data.

Information of manufacturing quality inspection data that is collected and accumulated from the facility equipment is the achievement values of "object," "time," and "situation (inspection results)," and the remaining "subject," "event," and "place" are consistent with the previously created manufacturing plan. Specifically, the manufacturing plan specifies that the inspection facility 1 corresponds to an inspection line and should start inspection processes of "CPU mounting inspection" and "memory inspection" in the inspection station at predetermined times. In comparison with this plan, the achievement values "object," "time," and "situation" are accumulated to provide the manufacturing quality inspection data.

Specifically, as shown in the manufacturing quality inspection data of FIG. 11, the achievement data is stored in which the mounting inspection was performed at 11:00 on September second, 2016 for the CPU having the component part number (E-001) and the serial ID (41234) mounted onto the motherboard having the manufacturing part number (D-001) and having the serial ID (31235) corresponding to the object of manufacturing and operation achievement data and no problem was found in the subsequent mounting check (situation). Similarly, the achievement of memory mounting is stored.

In Embodiment 1, procurement achievement data is stored as data about achievements of procurement of components of products used in the manufacturing processes as shown in FIG. 11. The procurement achievement data is provided according to the goods arrival planning data model.

In the example of FIG. 11, in comparison with the goods arrival planning data shown in FIG. 10, the achievements (goods arrival achievements) are stored such that the CPUs (object) having the component part number (E-001) and serial IDs (312-) corresponding to the object in the manufacturing and operation achievement data were procured (arrived) from the CPU manufacturing factory on September first, 2016. Similarly, memory procurement achievement data is stored.

FIG. 12 is a diagram showing a flow of processing in the information management system 100 according to Embodiment 1. As shown in FIG. 12, the factory receives the created production management plan from the business management layer responsible for planning and design of products, makes the manufacturing plan and goods arrival plan based on the production management plan, and registers the manufacturing plan and goods arrival plan in the MES (S1). The MES receives input of achievements of manufacturing performed based on the registered manufacturing plan and registration of goods arrival achievements (S2).

The information management system 100 in the factory includes the production request data model corresponding to the production management plan, the production instruction data model corresponding to the manufacturing plan, and the goods arrival planning data model corresponding to the goods arrival plan previously prepared in the storage apparatus 130. The data accumulation management section 123 structures and accumulates the manufacturing plan and manufacturing achievements acquired from the MES into the data models according to the data structure definition template consisting of "subject (Who)," "object (Whom)," "event (What)," "time (When)," "place (Where)," and "situation (How)."

Figure 13:
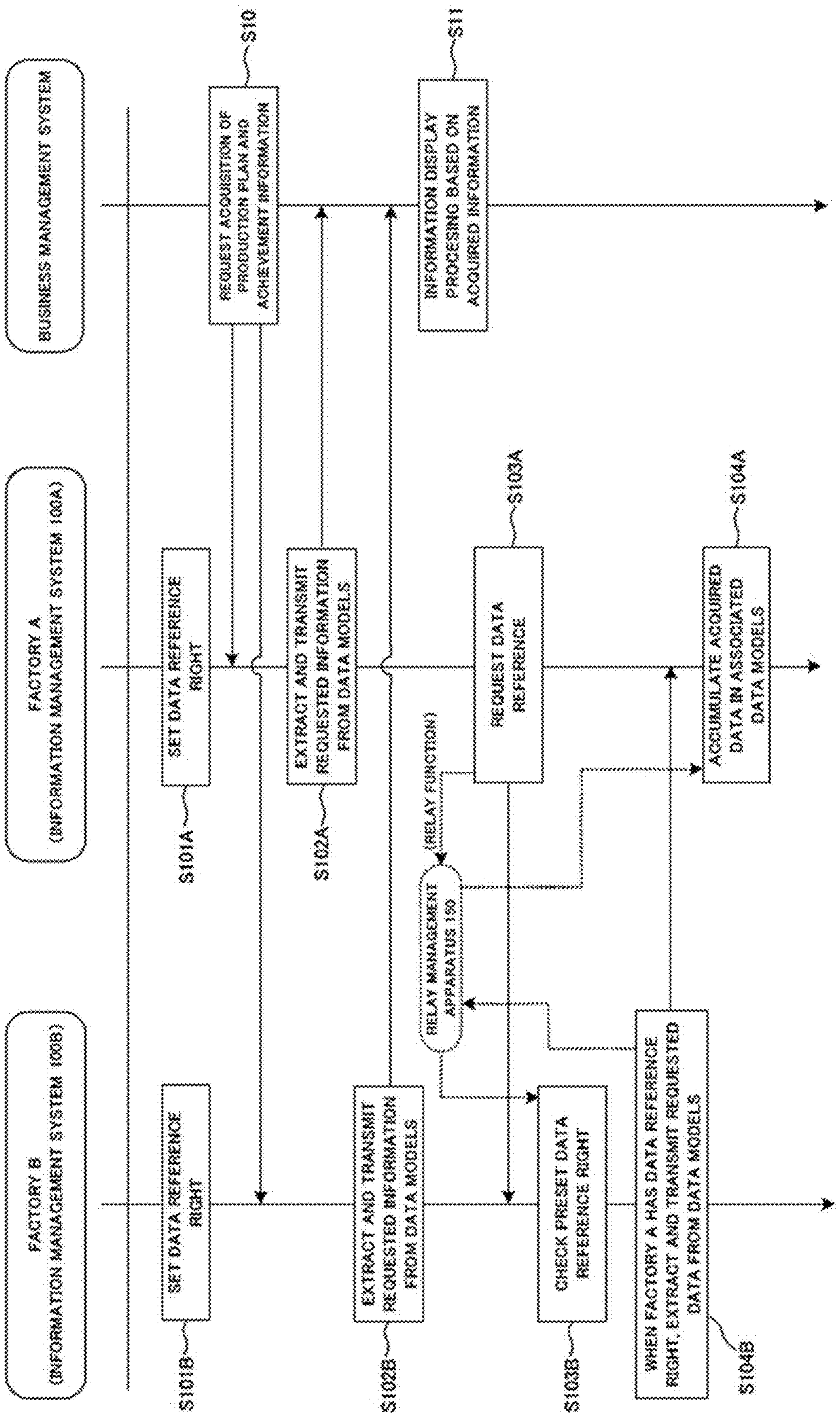
FIG. 13 A diagram showing a flow of data reference processing in the information management system according to Embodiment 1.

FIG. 13 is a diagram showing a flow of data reference processing on the information platform in which the information management system according to Embodiment 1 is used.

First, the information management systems 100A, 100B in factories set data reference right information (S101A, S101B). The business management layer transmits a request for acquiring the production plan and/or achievement information to the target information management systems 100A, 100B in the factories through a predetermined business management control system of the business management layer (S10).

In each of the information management systems 100A, 100B, the data reference management section 122 performs data reference limit processing. When reference is allowed, each of the information management systems 100A, 100B extracts the requested information from the data models and transmits the extracted information to the predetermined business management control system of the business management layer (S102A, S102B).

The business management control system is, for example, a system or an apparatus which allows viewing of the information of the factories, and may be any system or apparatus which allows the business management layer or persons responsible for production planning or manufacturing in the factories to view (display) various types of information through a predetermined screen (or a tool for visualizing the information). Similar configurations and processing can be provided in response to a request for information viewing etc. from a different system connectable to the information management system 100 over a network, not limited to the business management control system.

In another aspect of the business management control system, the information management system 100 can be configured to have the function. For example, as described above, the information management section 121 includes the screen application function for referring to the information via the data models in its own factory, and also serves as the screen application for referring to the information acquired from the data models in other factories. Thus, the business management layer or persons responsible for production planning or manufacturing in the factories may access any one of the cooperating factories (information management system 100) with a predetermined terminal apparatus to cause the information management section 121 to serve as an information display application for allowing viewing of the information of the factories.

Figure 14:
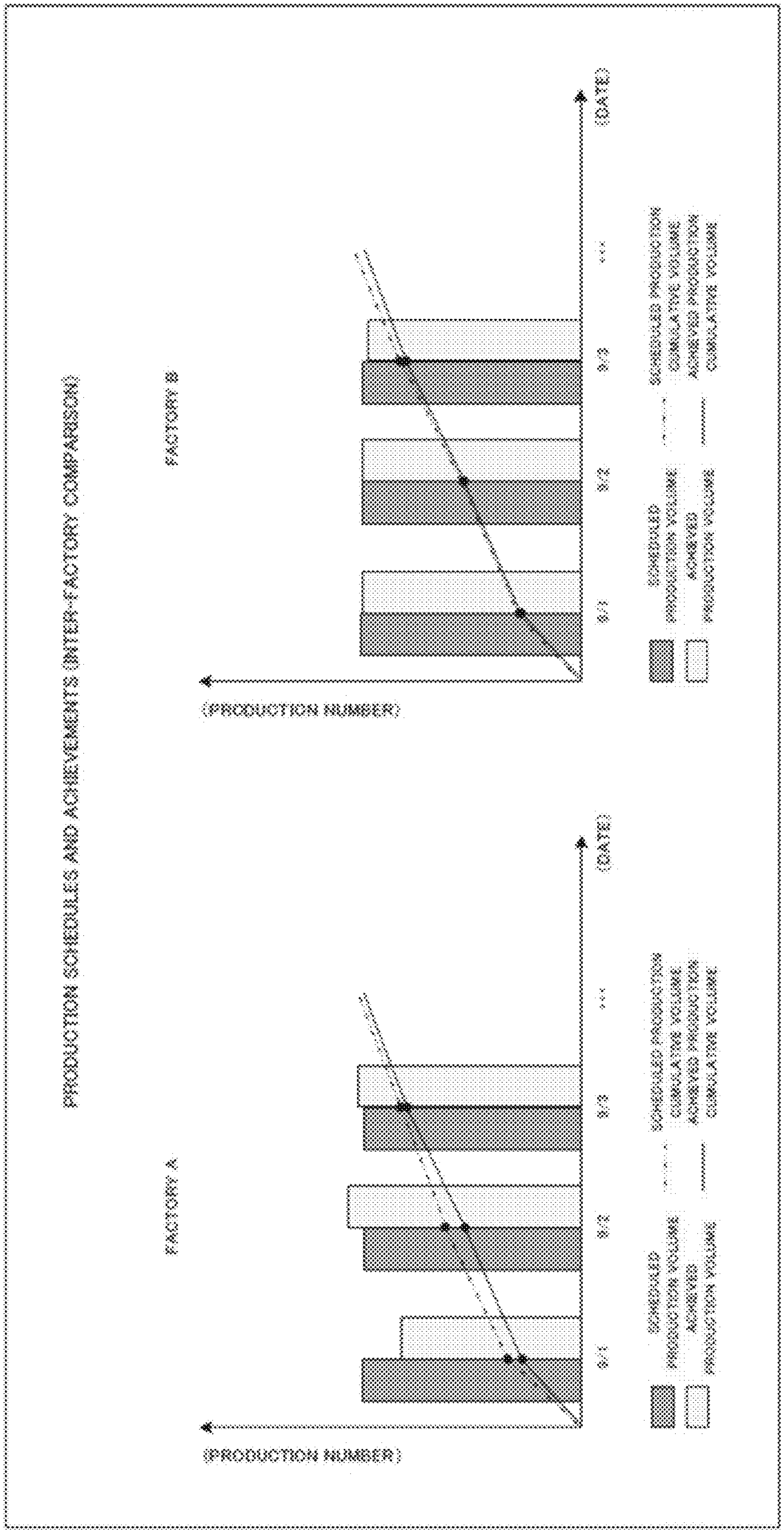
FIG. 14 A diagram showing an example of an inter-factory comparison screen according to Embodiment 1.

The information extracted in response to the reference request is accumulated in the data models structured and accumulated according to the common data structure definition template. This allows the business management layer to share the information without previously knowing and analyzing the form of information management in the factory from which the information is acquired. FIG. 14 is a diagram showing an example of an inter-factory comparison screen.

Next, as shown in FIG. 13, the factory A can make a data reference request to the factory B. In this case, the information management system 100A transmits the data reference request to the information management system 100B in the factory B (S103A). In the factory B, the data reference management section 122 performs data reference limit processing by checking the data reference right of the factory A (S103B). In response to determination that the factory A has the data reference right, the data reference management section 122 of the factory B extracts the reference requested data from the associated data models and transmits the extracted data to the factory A (S104B). The factory A receives the data transmitted from the information management system 100B in the factory B and accumulates the data in the associated data models (S104A).

FIG. 15 is a diagram showing an example of inter-factory information linking. Since the factory A receives supply of parts manufactured in the factory B and manufactures products incorporating the parts, the information management system 100A in the factory A refers to production plan/achievements of the factory B and accumulates the information provided from the factory B (information accumulated in the data models of the information management system 100B) in the data model of its goods arrival planning data.

In the inter-factory information linking, similarly to the above case, the information extracted in response to the reference request is accumulated in the data models structured and accumulated according to the common data structure definition template. This allows the factory A to share the information only by knowing the relationship of information reference based on the common data structure definition without previously knowing and analyzing the form of information management in the factory B from which the information is acquired.

In the example of FIG. 13, the inter-factory information linking through the relay management apparatus 150 shown in FIG. 8 is performed along flows shown by dotted lines. Although FIG. 13 shows an example in which the inter-factory information linking is performed via the relay apparatus 150, the present invention is not limited thereto, and the data reference request from the business management control system to each factory can also be performed via the relay management apparatus 150. In such a case, similarly to the inter-factory information linking, the data reference request, transmission of the requested data etc. are performed via the relay management apparatus 150.

Figure 16:
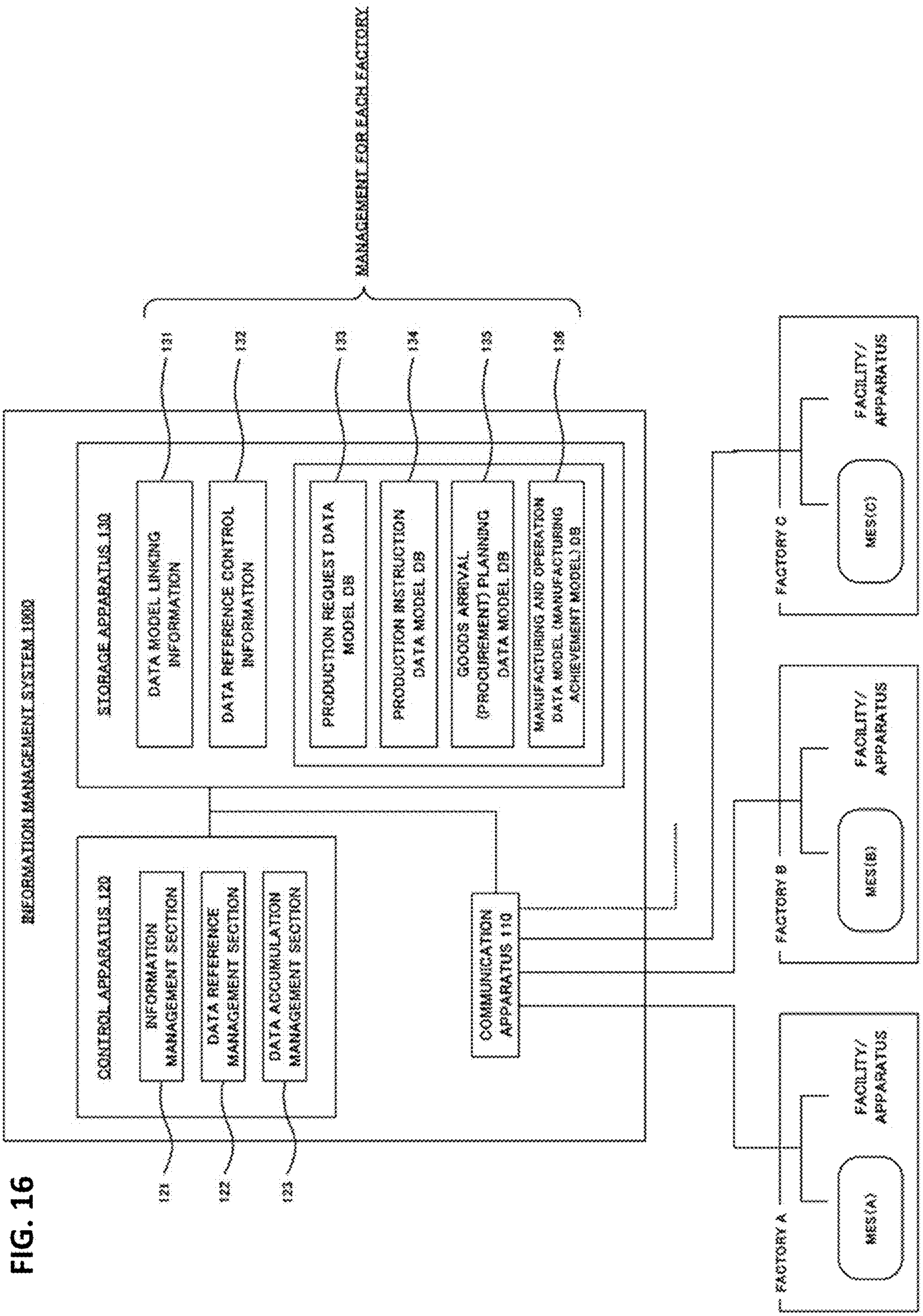
FIG. 16 A diagram showing a variation of the information management system according to Embodiment 1.

FIG. 16 is a diagram showing a variation of the information management system. The information management system 1000 shown in FIG. 16 employs a centralized system configuration which centralizes production management of products produced in multiple cooperating factories.

Specifically, the information management system 1000 is connected to multiple factories over networks, and various types of information and data models held in the storage apparatus 130 are managed in accumulation regions segmented in association with the respective factories. The data accumulation management section 123 can structure information acquired from each factory through its MES into data models and accumulate them, and the data reference management section 122 can set data reference control information and perform data reference control processing for each factory. The variation shown in FIG. 16 has a system configuration of a so-called cloud type without requiring individual system management in the respective factories.

The functions constituting the information management apparatus 100 described above can be implemented by a program. A computer program previously provided for implementing the functions can be stored on an auxiliary storage apparatus, the program stored on the auxiliary storage apparatus can be read by a control section such as a CPU to a main storage apparatus, and the program read to the main storage apparatus can be executed by the control section to achieve of the functions of the respective components.

The program may be recorded on a computer readable recording medium and provided for the computer. Examples of the computer readable recording medium include optical disks such as CD-ROMs, phase-change optical disks such as DVD-ROMs, magneto-optical disks such as Magnet-Optical (MO) disks and Mini Disks (MD), magnetic disks such as floppy Disks® and removable hard disks, and memory cards such as compact Flash® memory cards, smart media, SD memory cards, and memory sticks. Hardware apparatuses such as integrated circuits (such as IC chips) designed and configured specifically for the purpose of the present invention are included in the recording medium.

While the exemplary embodiment of the present invention has been described above, the embodiment is only illustrative and is not intended to limit the scope of the present invention. The novel embodiment can be implemented in various other forms, and various omissions, substitutions, and modifications can be made thereto without departing from the spirit or scope of the present invention. These embodiments and variations are encompassed within the spirit or scope of the present invention and within the invention set forth in the claims and the equivalents thereof.

DESCRIPTION OF THE REFERENCE NUMERALS

100 INFORMATION MANAGEMENT SYSTEM
110 COMMUNICATION APPARATUS
120 CONTROL APPARATUS
121 INFORMATION MANAGEMENT SECTION
122 DATA REFERENCE MANAGEMENT SECTION
123 DATA ACCUMULATION MANAGEMENT SECTION
130 STORAGE APPARATUS
131 DATA MODEL LINKING INFORMATION
132 DATA REFERENCE CONTROL INFORMATION
133 PRODUCTION REQUEST DATA MODEL DB
134 PRODUCTION INSTRUCTION DATA MODEL DB
135 GOODS ARRIVAL (PROCUREMENT) PLANNING DATA MODEL DB
136 MANUFACTURING AND OPERATION DATA MODEL DB

The invention claimed is:

1. An information management system for production management of products produced in multiple cooperating factories, each of the factories holding a manufacturing plan including a manufacturing schedule and a manufacturing instruction based on a production management plan, a goods arrival plan relating to procurement from at least one of the other cooperating factories, and achievements of the manufacturing plan and the goods arrival plan, and including an existing manufacturing management system configured to independently manage plans and achievements of manufacturing in the factory, the information management system comprising:

a storage apparatus configured to store, for each of the factories, data models serving as regions for accumulating the plans and the achievements of manufacturing in the factory, the data models including a production request data model corresponding to the production management plan, a production instruction data model corresponding to the manufacturing plan, and a goods arrival planning data model corresponding to the goods arrival plan; and one or more processors functioning as:

a data accumulation management apparatus configured to structure the plans and the achievements of manufacturing acquired thorough the manufacturing management systems in the factories into the data models according to a data structure definition template constituting of predetermined items and to accumulate the data models;

an information management apparatus configured to refer to information about the plans and achievements of manufacturing in at least one of the other factories via the data models; and a data reference management section configured to set, for each of the factories, first reference limit information indicating an information disclosure range provided for a user in the factory, and second reference limit information indicating an information disclosure range provided for a user in another factory, wherein, based on the first reference limit information, the data reference management section performs user authentication and reference limit control and, in response to determination of reference allowed, allows acquisition of some or all data from the data models for use in the information management section, and, in response to determination of reference not allowed, prevents acquisition of some or all data from the data models for use in the information management section, and based on the second reference limit information and in response to reception of an information reference request from another factory, the data reference management section performs reference limit control and, in response to determination of reference allowed, allows transmission of some or all data of the data models to the other factory, and, in response to determination of reference not allowed, prevents transmission of some or all data of the data models to the other factory.

2. The information management system according to claim 1, wherein the information management system is provided for each of the factories, the information management system further comprising a relay management apparatus configured to store a destination IP address of the information management system in each of the factories, to perform connection control to receive an information reference request from one of the factories to another factory and connect to the information management system in the other factory to which the information reference request is directed with the associated destination IP address, and to perform relay control to acquire information about the plans and the achievements of manufacturing based on the data models provided from the information management system to which the information reference request is directed and transmit the acquired information to the information management system in the factory which made the information reference request.

3. The information management system according to claim 2, wherein the relay management apparatus is provided for any one of the information management systems in the factories.

4. The information management system according to claim 1, wherein the predetermined items include "subject (Who)," "object (Whom)," "event (What)," "time (When)," "place (Where)," and "situation (How)".

5. An information management system for production management of products produced in multiple cooperating factories, each of the factories holding a manufacturing plan created based on a production management plan and a manufacturing achievement of the manufacturing plan, and including an existing manufacturing management system configured to independently manage plans and achievements of manufacturing in the factory, the information management system comprising:

a storage apparatus configured to store, for each of the factories, a data model serving as a region for accumulating the plans and the achievements of manufacturing in the factory, the data model being a production instruction data model corresponding to the manufacturing plan; and one or more processors functioning as:

a data accumulation management apparatus configured to structure the plans and the achievements of manufacturing acquired thorough the manufacturing management systems in the factories into the production instruction data model according to a data structure definition template constituting of predetermined items and to accumulate the data model;

an information management apparatus configured to refer to the plans and the achievements of manufacturing in the cooperating factories from each of the data models in the factories; and a data reference management section configured to set, for each of the factories, first reference limit information indicating an information disclosure range provided for a user in the factory, and second reference limit information indicating an information disclosure range provided for a user in another factory, wherein, based on the first reference limit information, the data reference management section performs user authentication and reference limit control and, in response to determination of reference allowed, allows acquisition of some or all data from the data models for use in the information management section, and, in response to determination of reference not allowed, prevents acquisition of some or all data from the data models for use in the information management section, and based on the second reference limit information and in response to reception of an information reference request from another factory, the data reference management section performs reference limit control and, in response to determination of reference allowed, allows transmission of some or all data of the data models to the other factory, and, in response to determination of reference not allowed, prevents transmission of some or all data of the data models to the other factory.

6. The information management system according to claim 5, wherein the predetermined items include "subject (Who)," "object (Whom)," "event (What)," "time (When)," "place (Where)," and "situation (How)".

7. An information management system for manufacturing management of products manufactured through multiple manufacturing processes, each of the manufacturing processes holding a manufacturing plan including a manufacturing schedule and a manufacturing instruction based on a production management plan and achievements of the manufacturing plan, and including an existing manufacturing management system configured to independently manage plans and achievements of manufacturing in the manufacturing process, the information management system comprising:

a storage apparatus configured to store, for each of the manufacturing processes, data models serving as regions for accumulating the plans and the achievements of manufacturing, the data models including a production request data model corresponding to the production management plan and a production instruction data model corresponding to the manufacturing plan; and one or more processors functioning as:

a data accumulation management apparatus configured to structure the plans and the achievements of manufacturing acquired thorough the manufacturing management systems into the data models according to a data structure definition template constituting of predetermined items and to accumulate the data models;

an information management apparatus configured to refer to information about the plans and the achievements of manufacturing in at least one of the other manufacturing processes via the data models; and a data reference management section configured to set, for each of the factories, first reference limit information indicating an information disclosure range provided for a user in the factory, and second reference limit information indicating an information disclosure range provided for a user in another factory, wherein, based on the first reference limit information, the data reference management section performs user authentication and reference limit control and, in response to determination of reference allowed, allows acquisition of some or all data from the data models for use in the information management section, and, in response to determination of reference not allowed, prevents acquisition of some or all data from the data models for use in the information management section, and based on the second reference limit information and in response to reception of an information reference request from another factory, the data reference management section performs reference limit control and, in response to determination of reference allowed, allows transmission of some or all data of the data models to the other factory, and, in response to determination of reference not allowed, prevents transmission of some or all data of the data models to the other factory.

8. The information management system according to claim 7, wherein the predetermined items include “subject (Who),” “object (Whom),” “event (What),” “time (When),” “place (Where),” and “situation (How)”.

* * * * *